(12) United States Patent
MacDougall et al.

(10) Patent No.: US 8,896,632 B2
(45) Date of Patent: Nov. 25, 2014

(54) ORIENTING DISPLAYED ELEMENTS RELATIVE TO A USER

(75) Inventors: Francis MacDougall, Ottawa (CA); Evan Hildreth, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 517 days.

(21) Appl. No.: 12/559,147

(22) Filed: Sep. 14, 2009

(65) Prior Publication Data
US 2010/0066763 A1 Mar. 18, 2010

Related U.S. Application Data

(60) Provisional application No. 61/096,367, filed on Sep. 12, 2008.

(51) Int. Cl.
G09G 5/00 (2006.01)
G06F 1/16 (2006.01)
G06K 9/00 (2006.01)
G06K 9/32 (2006.01)

(52) U.S. Cl.
CPC .......... *G09G 5/00* (2013.01); *G06F 2200/1637* (2013.01); *G09G 2340/14* (2013.01); *G06F 1/1626* (2013.01); *G06K 9/00248* (2013.01); *G09G 2340/0492* (2013.01); *G06K 9/3208* (2013.01); *G09G 2354/00* (2013.01)
USPC ............................. 345/659; 345/173; 715/702

(58) Field of Classification Search
USPC ........................................................ 345/659
See application file for complete search history.

(56) References Cited

U.S. PATENT DOCUMENTS

| | | | |
|---|---|---|---|
| 6,348,928 B1* | 2/2002 | Jeong | 345/649 |
| 6,567,101 B1 | 5/2003 | Thomas | |
| 6,982,728 B1* | 1/2006 | Nicolas et al. | 345/649 |
| 7,184,911 B2* | 2/2007 | Wakai | 702/107 |
| 7,626,598 B2* | 12/2009 | Manchester | 345/659 |
| 7,724,242 B2 | 5/2010 | Hillis et al. | |
| 7,724,296 B2* | 5/2010 | Lonn | 348/333.12 |

(Continued)

FOREIGN PATENT DOCUMENTS

| | | |
|---|---|---|
| CN | 1720555 A | 1/2006 |
| CN | 101460977 A | 6/2009 |
| EP | 1124175 A2 | 8/2001 |
| WO | 2004036292 A2 | 4/2004 |

OTHER PUBLICATIONS

International Search Report & Written Opinion issued in International Application No. PCT/US2009/056827, mailed Nov. 6, 2009, 16 pages.

(Continued)

*Primary Examiner* — M Good Johnson
(74) *Attorney, Agent, or Firm* — Kilpatrick Townsend & Stockton LLP

(57) ABSTRACT

One or more elements are initially displayed on a display component of an electronic device. After the one or more elements have been displayed on the display component of the electronic device, an image of a user of the electronic device is captured, and an orientation of the electronic device relative to the user is determined based on the captured image of the user of the electronic device. Thereafter, an orientation of at least one of the displayed elements is adjusted relative to the display component of the electronic device based on the determined orientation of the electronic device relative to the user.

42 Claims, 15 Drawing Sheets

(56) References Cited

U.S. PATENT DOCUMENTS

| | | | |
|---|---|---|---|
| 8,031,212 B2* | 10/2011 | Nicolas et al. | 345/659 |
| 8,036,917 B2 | 10/2011 | Kariathungal et al. | |
| 8,054,343 B2* | 11/2011 | Cheatle et al. | 348/239 |
| 2002/0163537 A1 | 11/2002 | Vernier et al. | |
| 2004/0201595 A1 | 10/2004 | Manchester | |
| 2005/0104848 A1 | 5/2005 | Yamaguchi et al. | |
| 2005/0253807 A1 | 11/2005 | Hohmann et al. | |
| 2005/0285845 A1 | 12/2005 | Dehlin | |
| 2007/0040907 A1 | 2/2007 | Kern et al. | |
| 2007/0064004 A1 | 3/2007 | Bonner et al. | |
| 2007/0078552 A1 | 4/2007 | Rosenberg | |
| 2007/0201725 A1 | 8/2007 | Steinberg et al. | |
| 2007/0220444 A1* | 9/2007 | Sunday et al. | 715/788 |
| 2008/0239131 A1* | 10/2008 | Thorn | 348/333.01 |
| 2009/0060346 A1* | 3/2009 | Guerzhoy et al. | 382/197 |
| 2009/0313584 A1* | 12/2009 | Kerr et al. | 715/849 |
| 2010/0066667 A1 | 3/2010 | MacDougall et al. | |
| 2010/0125816 A1* | 5/2010 | Bezos | 715/863 |

OTHER PUBLICATIONS

International Search Report & Written Opinion issued in International Application No. PCT/US2009/056825, mailed Oct. 26, 2009, 8 pages.

Holman D, "Gazetop: Interaction Techniques for Gaze-Aware Tabletops", CHI 2007 Doctoral Consortium, San Jose, Apr. 28-May 3, 2007, pp. 1657-1660.

* cited by examiner

The quick brown fox jumped over the lazy dog.
The quick brown fox jumped over the lazy dog.
The quick brown fox jumped over the lazy dog.
The quick brown fox jumped

Fig. 10A

The quick brown fox jumped over the lazy dog.
The quick brown fox jumped over the lazy dog.
The quick brown fox jumped over the lazy dog.

Fig. 10B

The quick brown fox jumps over the lazy dog.

The quick brown fox jumps over the lazy dog.

The quick brown fox jumps over the lazy dog.

Fig. 11A

The quick brown fox jumps over the lazy dog.
The quick brown fox jumps over the lazy dog.
The quick brown fox jumps over the lazy dog.
The quick brown fox jumps over the lazy dog.
The quick brown fox jumps over the lazy dog.
The quick brown fox jumps over the lazy dog.

Fig. 11B

ORIENTING DISPLAYED ELEMENTS RELATIVE TO A USER

CROSS-REFERENCE TO RELATED APPLICATIONS

This application claims the benefit of U.S. Provisional Application No. 61/096,367, filed Sep. 12, 2008, which is incorporated by reference.

TECHNICAL FIELD

This disclosure relates to orienting elements displayed on a display of an electronic device relative to a user of the electronic device.

BACKGROUND

Many electronic devices include display components that facilitate user interaction with the electronic devices by generating visual output that is displayed to users of the electronic devices and/or, in some cases, receiving input from users of the electronic devices.

SUMMARY

In one general aspect, one or more elements are initially displayed on a display component of an electronic device. After the one or more elements have been displayed on the display component of the electronic device, an image of a user of the electronic device is captured, and an orientation of the electronic device relative to the user is determined based on the captured image of the user of the electronic device. Thereafter, an orientation of at least one of the displayed elements is adjusted relative to the display component of the electronic device based on the determined orientation of the electronic device relative to the user.

Implementations may include one or more of the following features. For example, a displayed element may be displayed with an initial orientation relative to the user. Thereafter, the orientation of the displayed element relative to the display component of the electronic device may be adjusted such that the orientation of the displayed element, relative to the user, is substantially the same as the initial orientation of the at least one displayed element relative to the user. Prior to adjusting the orientation of the displayed element, it may be determined that the displayed element is not appropriately oriented relative to the user, and the orientation of the at least one displayed element relative to the display component of the electronic device may be adjusted in response to determining that the at least one displayed element is not appropriately oriented relative to the user. Adjusting the orientation of the least one displayed element relative to the display component of the electronic device may be performed automatically without user involvement.

In some implementations, the display component of the electronic device may support displaying elements according to at least a portrait orientation relative to the display component and a landscape orientation relative to the display component. In such implementations, an element may be displayed on the display component of the electronic device according to the landscape orientation relative to the display component. However, the display component of the electronic device may be determined to be in a portrait orientation relative to the user. Therefore, the orientation of the displayed element may be changed from the landscape orientation relative to the display component to the portrait orientation relative to the display component in response to determining that the display component of the electronic device is in a portrait orientation relative to the user. Similarly, the display component of the electronic device initially may display the element on the display component of the electronic device according to the portrait orientation relative to the display component. However, the display component of the electronic device may be determined to be in a landscape orientation relative to the user. Therefore, the orientation of the displayed element may be changed from the portrait orientation relative to the display component to the landscape orientation relative to the display component in response to determining that the display component of the electronic device is in a landscape orientation relative to the user.

In some implementations, the image that is captured of the user of the electronic device may include at least a portion of the user's face and/or head. In such implementations, the orientation of the user's face and/or head in the captured image may be determined (e.g., using an AdaBoost process), and the orientation of the electronic device relative to the user may be determined based on the determined orientation of the user's face and/or head in the captured image. For example, the image that is captured of the user of the electronic device may include the user's eyes, the orientation of the user's eyes in the captured image may be determined, and the orientation of the electronic device relative to the user may be determined based on the determined orientation of the user's eyes in the captured image.

Additionally or alternatively, the image that is captured of the user of the electronic device may include at least a portion of the user's body. In such implementations, the orientation of the portion of the user's body in the captured image may be determined, and the orientation of the electronic device relative to the user may be determined based on the determined orientation of the portion of the user's body in the captured image.

In some implementations, the image that is captured of the user of the electronic device may include at least a portion of the user's face. At least two different versions of the captured image, each being oriented differently, may be generated. Thereafter, face detection processing techniques may be performed on each of the differently-oriented versions of the captured image, and a particular version of the captured image may be selected as the version of the captured image that represents the orientation of the electronic device relative to the user based on results of the face detection processing techniques. The orientation of the selected version of the captured image relative to the orientation of the originally captured image then may be determined, and the orientation of the electronic device relative to the user may be determined based on the determined orientation of the selected version of the captured image relative to the orientation of the originally captured image. As a result of performing the face processing techniques on the differently-oriented versions of the captured image, a score may be assigned to each differently-oriented version of the captured image reflecting the significance of the presence of a face in the version of the captured image. The version of the captured image that was assigned the score that reflects the most significant presence of a face then may be selected as the version of the captured image that represents the orientation of the electronic device relative to the user.

After determining the orientation of the electronic device relative to the user and adjusting the orientation of the at least one displayed element relative to the display component of the electronic device, an image of another user of the electronic device may be captured, and the orientation of the electronic device relative to the other user may be determined. Then, the orientation of the at least one displayed element relative to the display component of the electronic device may be determined based on the determined orientation of the electronic device relative to the other user.

In some cases, it may be determined that the orientation of the electronic device relative to the user has changed from an earlier orientation of the electronic device relative to the user. In such cases, the orientation of the at least one displayed element relative to the display component may be changed in response to the determination that the orientation of the electronic device relative to the user has changed from the earlier orientation of the electronic device relative to the user. In other cases, it may be determined that the orientation of the electronic device relative to the user has not changed from an earlier orientation of the electronic device relative to the user. In such cases, the orientation of the at least one displayed element relative to the display component may be maintained in response to the determination that the orientation of the electronic device relative to the user has not changed from the earlier orientation of the electronic device relative to the user.

In some implementations, the orientation of the electronic device relative to the user may be determined before initially displaying an element on the display component of the electronic device. In such implementations, an initial orientation for the element relative to the display component may be determined based on the determined initial orientation of the electronic device relative to the user, and the element may be displayed on the display component of the electronic device with the initial orientation determined for the at least one element.

In some implementations, the orientation of the electronic device relative to the user may be determined exclusively from images captured of the user without also relying on gravity to determine the orientation of the electronic device relative to the user.

In other implementations, a first element that is to be oriented relative to a user (e.g., text) and a second element that is to be oriented relative to gravity (e.g., a video) may be displayed on the display component of the electronic device. In such implementations, it may be determined that the first element is not appropriately oriented relative to the user based on the determined orientation of the electronic device relative to the user. Therefore, the orientation of the first element relative to the display component of the electronic device may be adjusted in response to determining that the at least one displayed element is not appropriately oriented relative to the user. In addition, the orientation of the electronic device relative to gravity may be determined. Based on the determined orientation of the electronic device relative to gravity, it then may be determined that the second element is not appropriately oriented relative to gravity. Therefore, the orientation of the second element relative to the display component of the electronic device may be adjusted in response to determining that the at least one displayed element is not appropriately oriented relative to gravity.

In another general aspect, one or more elements are displayed on a display component of an electronic device. One or more images of a user of the electronic device are captured, and the orientation of the electronic device relative to the user is monitored based on the one or more captured images of the user of the electronic device. The display of at least one of the displayed elements on the display component then is controlled based on results of monitoring the orientation of the electronic device relative to the user.

Implementations may include one or more of the following features. For example, a change in the orientation of the electronic device relative to the user from an earlier orientation of the electronic device relative to the user may be detected. In response, an appropriate change to the orientation of the at least one displayed element relative to the display component may be determined based on the detected change in the orientation of the electronic device relative to the user. Thereafter, the change to the orientation of the at least one displayed element relative to the display component that was determined to be appropriate based on the detected change in the orientation of the electronic device relative to the user may be effected.

For example, it may be determined that the orientation of the electronic device relative to the user rotated substantially positive ninety degrees from the earlier orientation of the electronic device relative to the user. Therefore, a determination may be made to rotate the orientation of the at least one displayed element substantially negative ninety degrees relative to the display component in response to determining that the orientation of the electronic device relative to the user rotated substantially positive ninety degrees from the earlier orientation of the electronic device relative to the user. Thereafter, the orientation of the at least one displayed element may be rotated substantially negative ninety degrees relative to the display component.

Later, it may be determined that the orientation of the electronic device relative to the user rotated another substantially positive ninety degrees. Therefore, the orientation of the at least one displayed element may be rotated another substantially ninety degrees relative to the display component in response to determining that the orientation of the electronic device relative to the user rotated another substantially positive ninety degrees.

In some cases, it may be determined that the orientation of the electronic device relative to the user rotated substantially positive one-hundred and eighty degrees from the earlier orientation of the electronic device relative to the user. In such cases, it may be determined to rotate the orientation of the at least one displayed element substantially negative one-hundred and eighty degrees relative to the display component in response to determining that the orientation of the electronic device relative to the user rotated substantially positive one-hundred and eighty degrees from the earlier orientation of the electronic device relative to the user. Thereafter, the orientation of the at least one displayed element may be rotated substantially negative one-hundred and eighty degrees relative to the display component.

In other cases, it may be determined that the orientation of the electronic device relative to the user rotated a number of degrees relative to the user that is in a range between substantially zero degrees and substantially ninety degrees in a positive direction from the earlier orientation of the electronic device relative to the user. In such cases, a determination may be made to rotate the orientation of the at least one displayed element substantially the number of degrees in the range between substantially zero degrees and substantially ninety degrees in a negative direction relative to the display component in response to determining that the orientation of the electronic device relative to the user rotated the number of degrees relative to the user in the range between substantially zero degrees and substantially ninety degrees. Thereafter, the orientation of the at least one displayed element may be rotated substantially the number of degrees in the range between substantially zero degrees and substantially ninety degrees in a negative direction relative to the display component.

In still other cases, it may be determined that the orientation of the electronic device relative to the user has not changed from an earlier orientation of the electronic device relative to the user. In such cases, the orientation of the at least one displayed element relative to the display component may be maintained based on determining that the orientation of the electronic device relative to the user has not changed from an earlier orientation of the electronic device relative to the user.

In some examples, a change in the orientation of the electronic device relative to the user from an earlier orientation of the electronic device relative to the user may be detected. In response to detecting the change in orientation of the electronic device relative to the user, at least one displayed element may be hidden by removing the at least one displayed element from the display component. In addition, in response to detecting the change in orientation of the electronic device relative to the user, a first displayed element and a second displayed element may be maintained on the display component and a position and orientation of the first displayed element relative to the second displayed element may be changed on the display component. Further, in response to detecting the change in orientation of the electronic device relative to the user, text displayed on the display component may be formatted. For instance, a font size of the text displayed on the display component may be changed or a subset of the text displayed on the display component may be maintained while a remainder of the text displayed on the display component that is not included in the subset may be removed.

In yet another general aspect, a portable electronic device includes a display component that is configured to display output within a field of display and a camera that is configured to capture images within a field of view of the camera. The camera is positioned on the portable electronic device such that the field of view of the camera includes at least a portion of the field of display of the display component. The portable electronic device also includes a processing unit that is configured to process one or more images captured by the camera that include a user of the portable electronic device, monitor orientation of the portable electronic device relative to the user of the portable electronic device based on the one or more captured images that include the user of the portable electronic device, and control display on the display component of at least some of the output displayed on the display component based on results of monitoring the orientation of the electronic device relative to the user of the portable electronic device.

Implementations may include one or more of the following features. For example, in some implementations, the camera may be a video camera. In other implementations, the camera may be a still camera. The processing unit may control orientation relative to the display component of at least some of the output displayed on the display component based on results of monitoring the orientation of the electronic device relative to the user of the portable electronic device.

In still another implementation, an image is captured of a user of an electronic device that has a display component. Based on the captured image of the user of the electronic device, an initial orientation of the electronic device relative to the user of the electronic device is determined. Before displaying an element on the display component of the electronic device, an initial orientation for displaying the element relative to the display component of the electronic device is determined based on the determined initial orientation of the electronic device relative to the user of the electronic device. Thereafter, the element is displayed on the display component of the electronic device with the determined initial orientation for displaying the element relative to the display component.

The various aspects, implementations, and features disclosed may be implemented using, for example, one or more of a method, an apparatus, a system, tool, or processing device for performing a method, a program or other set of instructions, an apparatus that includes a program or a set of instructions, and a computer program embodied in a tangible, computer-readable medium. The tangible, computer-readable medium may include, for example, instructions, software, images, and other data.

The details of one or more implementations are set forth in the accompanying drawings and the description below. Other features will be apparent from the description and the drawings.

DESCRIPTION OF DRAWINGS

FIGS. 7A-7B, 8A-8B, 9A-9B, 10A-10B, 11A-11B, 12A-12B, and 13A-13B are illustrations of an example of a portable electronic device that is configured to control the arrangement of displayed items depending on whether the display of the portable electronic device is in a landscape or a portrait orientation relative to a user of the portable electronic device.

DETAILED DESCRIPTION

Figure 1A:
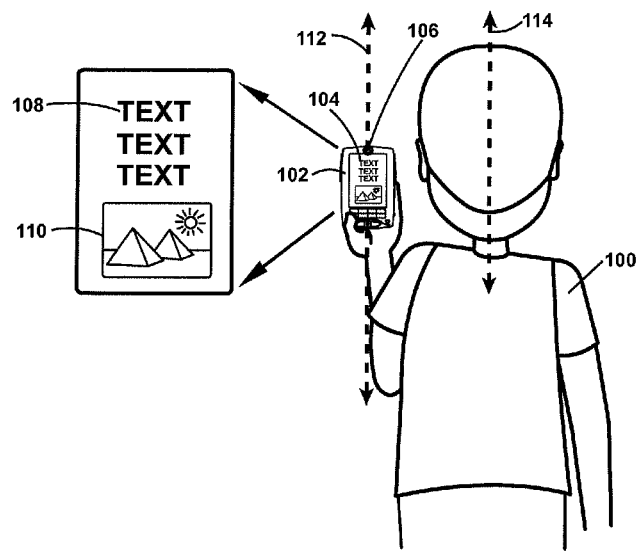
FIGS. 1A-1E are illustrations of a user interacting with an example of a portable electronic device that is configured to orient displayed elements in accordance with the portable electronic device's orientation relative to a user.

Many portable electronic devices including, for example, mobile telephones, portable digital assistants, portable music players (e.g., MP3 players), handheld computers, palmtop computers, and laptop computers include display components (e.g., liquid crystal displays (LCDs), organic light emitting diode (OLED) displays, plasma display panels (PDPs)) that display content and facilitate user interaction with the devices. In addition, portable electronic devices generally tend to be easily maneuverable, handheld devices that lend themselves to being held and/or positioned (whether intentionally or unintentionally) in a variety of different orientations relative to a user.

For example, while manipulating a portable electronic device, a user (intentionally or unintentionally) may rotate his/her hand resulting in a change of the orientation of the portable electronic device (or the display of the portable electronic device) relative to the user. Similarly, when a user retrieves a portable media device from a pocket or other resting place, the user inadvertently may grasp the portable device such that the conventional orientation of the portable electronic device (or the conventional orientation of the display of the portable electronic device) is upside down (or otherwise misaligned) relative to the user, potentially impeding the user's ability to view and easily make sense of elements displayed on the portable electronic device's display. Likewise, when a user glances at a portable electronic device that is lying in a rest position, for example, in response to an alert of an incoming e-mail, phone call, or instant message, the conventional orientation of the portable electronic device (or the conventional orientation of the display of the portable electronic device) may be misaligned relative to the user potentially making it difficult for the user to perceive elements presented on the portable electronic device's display.

To improve a user's ability to view, perceive, and interact with elements displayed on the display of a portable electronic device, the orientation of the portable electronic device (or the orientation of the display of the portable electronic device) relative to the user may be determined by capturing and processing a photograph or other image of the user, and elements may be displayed on the portable electronic device's display in a manner that is appropriate given the determined orientation of the portable electronic device (or the display of the portable electronic device) relative to the user. In addition, as the orientation of the portable electronic device (or the orientation of the display of the portable electronic device) changes relative to the user, elements displayed on the portable electronic device's display may be reoriented to accommodate the new orientation of the portable electronic device (or the display of the portable electronic device) relative to the user.

For example, a user of a portable electronic device may hold the portable electronic device such that the display of the portable electronic device is in a portrait orientation relative to the user, and the portable electronic device may determine that the display of the portable electronic device is in a portrait orientation relative to the user by capturing and processing one or more images of the user of the portable electronic device. In response to determining that the display of the portable electronic device is in a portrait orientation relative to the user, the portable electronic device may arrange elements displayed on the portable electronic device in a portrait orientation. At some point in time, the user of the portable electronic device may rotate the portable electronic device such that the display of the portable electronic device is in a landscape orientation relative to the user, and the portable electronic device may determine that the display of the portable electronic device is in a landscape orientation relative to the user by capturing and processing one or more images of the user of the portable electronic device. In response to determining that the display of the portable electronic device is in a landscape orientation relative to the user, the portable electronic device may reorient the elements displayed on the portable electronic device so that they are arranged in a landscape orientation.

It will be appreciated that the relationship between the orientation of a user of a portable electronic device and the orientation of the portable electronic device (or the orientation of the display of the portable electronic device) may be described from the perspective of the user of the portable electronic device or from the perspective of the portable electronic device (or the display of the portable electronic device), but that irrespective of the perspective from which the relationship is described, the relationship will be the same. Accordingly, the phrases "orientation of the portable electronic device (or orientation of the display of the portable electronic device) relative to the user" and "orientation of the user relative to the portable electronic device (or the display of the portable electronic device)" (and similar such phrases) may be used interchangeably throughout this disclosure.

In order to determine the orientation of a portable electronic device (or the display of the portable electronic device) relative to a user, a camera that is built into (or otherwise accessible to) the portable electronic device may take one or more still or video images of the user, and the images may be processed to determine the orientation of the portable electronic device (or the orientation of the display of the portable electronic device) relative to the user. For example, the camera may take one or more still or video images of the user's face, and the orientation of the portable electronic device (or the orientation of the display of the portable electronic device) relative to the user may be determined based on the orientation of the user's face in the still or video image(s) captured by the camera. As a user interacts with the portable electronic device, the portable electronic device's orientation (or the orientation of the portable electronic device's display) relative to the user may be monitored by taking and processing one or more additional still or video images on a continual, periodic, random, or event-triggered (e.g., in response to detection of motion of the portable electronic device) basis. Taking and processing one or more still or video images of a user of a portable electronic device may be a particularly useful technique for determining the orientation of the portable electronic device (or the display of the portable electronic device) relative to the user because it may enable a relatively accurate determination of the portable electronic device's orientation (or the orientation of the display of the portable electronic device) relative to the user irrespective of the portable electronic device's and/or the user's orientation relative to gravity, the earth's ground plate, and/or the horizon.

FIGS. 1A-1E are illustrations of a user 100 interacting with an example of a portable electronic device 102 that is configured to orient displayed elements in accordance with the portable electronic device's orientation (or the orientation of the display 104) relative to a user. Among other features, the portable electronic device 102 includes a display 104 and a camera 106. The portable electronic device is configured to use the camera 106 to take one or more still or video images of the user 100 and to determine the orientation of the portable electronic device 102 (or the orientation of the display 104) relative to the user 100 by processing the image(s) of the user 100 taken using the camera 106.

As illustrated in FIG. 1A, a first display element 108 that displays text and a second display element 110 that displays an image are displayed on the display 104 of the portable electronic device 102. In addition, the user 100 is holding the portable electronic device 102 in a vertical orientation relative to the user 100 such that a vertical axis 112 of the portable electronic device 102 (or display 104) is aligned with a vertical axis 114 of the user's face. When the vertical axis 112 of the portable electronic device 102 (or display 104) is aligned with the vertical axis 114 of the user's face, the vertical axis 112 of the portable electronic device 102 (or display 104) and the vertical axis 114 of the user's face may be said to be in phase with each other. When the vertical axis 112 of the portable electronic device 102 (or display 104) is not aligned with the vertical axis 114 of the user's face, the vertical axis 112 of the portable electronic device 102 (or display 104) and the vertical axis 114 of the user's face may be said to be out of phase with each other, with the angle between the vertical axis 112 of the portable electronic device 102 (or display 104) and the vertical axis 114 of the user's face being a measure of the degree to which the vertical axis 112 of the portable electronic device 102 (or display 104) and the vertical axis 114 of the user's face are out of phase with each other.

By capturing one or more images of the user 100 with the camera 106 and processing the image(s) captured by the camera 106, the portable electronic device 102 can determine that the vertical axis 112 of the portable electronic device 102 (or display 104) is aligned with the vertical axis 114 of the user's face. Therefore, the portable electronic device 102 has aligned the orientation of the first display element 108 and the second display element 110 on the display 104 with the vertical axis 114 of the user's face such that the top of the first display element 108 is aligned with the top of the user's face and the bottom of the first display element 108 is aligned with the bottom of the user's face and the top of the second display element 110 is aligned with the top of the user's face and the bottom of the second display element 110 is aligned with the bottom of the user's face.

Figure 1B:
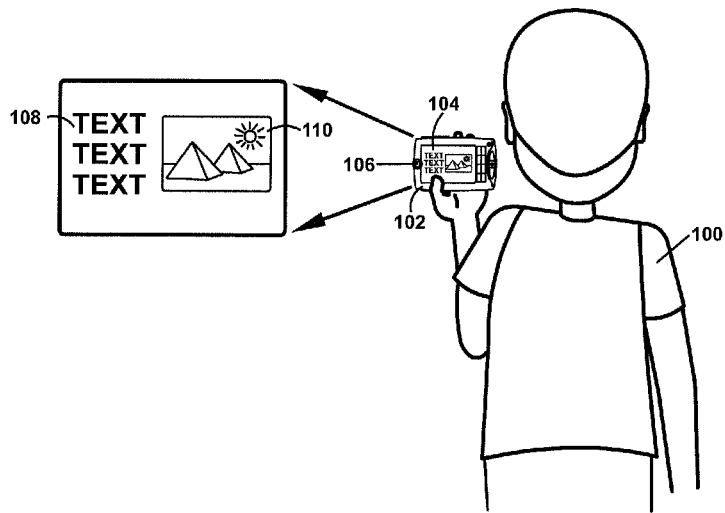

As illustrated in FIG. 1B, the user 100 has rotated the portable electronic device 102 approximately positive 90° relative to the user 100 from the orientation of the portable electronic device 102 relative to the user 100 in FIG. 1A such that the vertical axis (not shown) of the portable electronic device 102 (or display 104) is 90° out of phase with the vertical axis (not shown) of the user's face. By capturing one or more images of the user 100 with the camera 106 and processing the image(s) captured by the camera 106, the portable electronic device 102 can determine that the vertical axis (not shown) of the portable electronic device 102 (or display 104) is 90° out of phase with the vertical axis (not shown) of the user's face. Therefore, the portable electronic device 102 has rotated both the first display element 108 and the second display element 110 approximately negative 90° relative to the display 104 from the orientations of the first display element 108 and the second display element 110 relative to the display 104 in FIG. 1A. As a result, the portable electronic device 102 has preserved the orientations of the first display element 108 and the second display element 110 relative to the user 100, despite the fact that the portable electronic device 102 has been rotated approximately negative 90° from the orientation of the portable electronic device 102 relative to the user 100 in FIG. 1A.

Figure 1C:
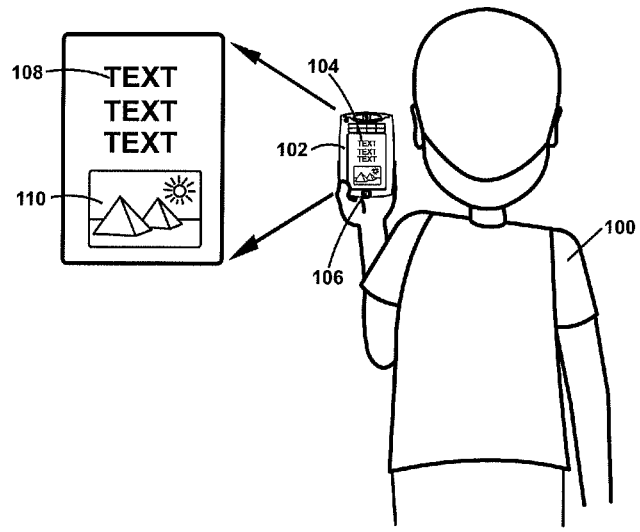

As illustrated in FIG. 1C, the user 100 has rotated the portable electronic device 102 another approximately positive 90° relative to the user 100 from the orientation of the portable electronic device 102 relative to the user 100 in FIG. 1B and approximately positive 180° relative to the user 100 from the orientation of the portable electronic device 102 relative to the user 100 in FIG. 1A such that the vertical axis (not shown) of the portable electronic device 102 (or the display 104) is 180° out of phase with the vertical axis (not shown) of the user's face. By capturing one or more images of the user 100 with the camera 106 and processing the image(s) captured by the camera 106, the portable electronic device 102 can determine that the vertical axis (not shown) of the portable electronic device 102 (or display 104) is 180° out of phase with the vertical axis (not shown) of the user's face. Therefore, the portable electronic device 102 has rotated both the first display element 108 and the second display element 110 approximately negative 90° relative to the display 104 from the orientations of the first display element 108 and the second display element 110 relative to the display 104 in FIG. 1B and approximately negative 180° relative to the display 104 from the orientations of the first display element 108 and the second display element 110 relative to the display 104 in FIG. 1A. In addition, the portable electronic device 102 also has rearranged the locations of the first display element 108 and the second display element 110 relative to the display 104 such that the second display element 110 is located nearer to the camera 106 than the first display element 108. As a result, the portable electronic device 102 has preserved the orientations of the first display element 108 and the second display element 110 relative to the user 100, despite the fact that the portable electronic device 102 has been rotated approximately positive 180° from the orientation of the portable electronic device 102 relative to the user 100 in FIG. 1A and approximately positive 90° from the orientation of the portable electronic device 102 relative to the user 100 in FIG. 1B.

Figure 1D:
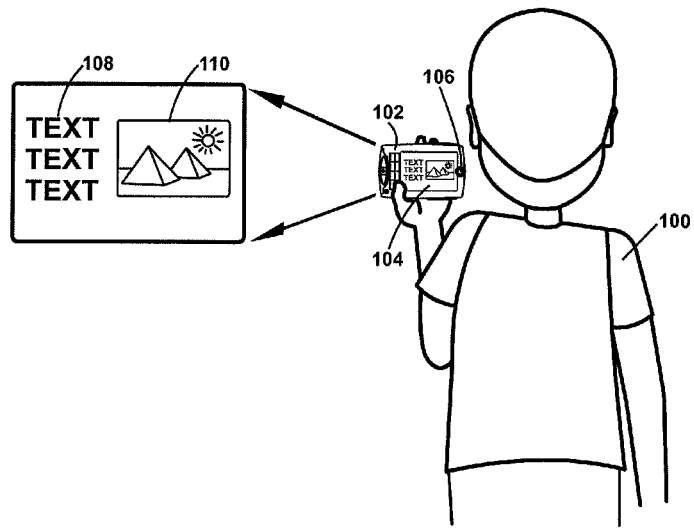

As illustrated in FIG. 1D, the user 100 has rotated the portable electronic device 102 another approximately positive 90° relative to the user 100 from the orientation of the portable electronic device 102 relative to the user 100 in FIG. 1C, approximately positive 180° relative to the user 100 from the orientation of the portable electronic device 102 relative to the user 100 in FIG. 1B, and approximately, positive 270° relative to the user from the orientation of the portable electronic device 102 relative to the user 100 in FIG. 1A such that the vertical axis (not shown) of the portable electronic device 102 (or display 104) is 270° out of phase with the vertical axis (not shown) of the user's face. By capturing one or more images of the user 100 with the camera 106 and processing the image(s) captured by the camera 106, the portable electronic device 102 can determine that the vertical axis (not shown) of the portable electronic device 102 (or display 104) is 270° out of phase with the vertical axis (not shown) of the user's face. Therefore, the portable electronic device 102 has rotated both the first display element 108 and the second display element 110 approximately negative 90° relative to the display 104 from the orientations of the first display element 108 and the second display element 110 relative to the display 104 in FIG. 1C, approximately negative 180° relative to the display 104 from the orientations of the first display element 108 and the second display element 110 relative to the display 104 in FIG. 1B, and approximately negative 270° relative to the display 104 from the orientations of the first display element 108 and the second display element 110 relative to the display 104 in FIG. 1A. As a result, the portable electronic device 102 has preserved the orientations of the first display element 108 and the second display element 110 relative to the user 100, despite the fact that the portable electronic device 102 has been rotated approximately positive 270° from the orientation of the portable electronic device 102 relative to the user 100 in FIG. 1A, approximately positive 180° from the orientation of the portable electronic device 102 relative to the user 100 in FIG. 1B, and approximately positive 90° from the orientation of the portable electronic device 102 relative to the user 100 in FIG. 1C.

Although FIGS. 1A-1D illustrate the user 100 rotating the portable electronic device 102 in approximately 90° increments relative to the user 102 and the portable electronic device 102 adjusting the orientations of the first display element 108 and the second display element 110 in corresponding approximately 90° increments relative to the display 104, in some implementations, the portable electronic device 102 is not limited to detecting the differences in phase between the vertical axis of the portable electronic device 102 (or display 104) and the vertical axis of the user's face in approximately 90° increments nor in some implementations is the portable electronic device 102 limited to adjusting the orientations of elements displayed on the display 104 in approximately 90° increments relative to the display 104. Rather, the portable electronic device 102 may be configured to detect phase differences between the vertical axis of the portable electronic device 102 (or display 104) and the vertical axis of the user's face anywhere within the range of 0-360°. In addition, the portable electronic device 102 also may be configured to adjust the orientations of elements displayed on the display 104 in any increment within the range of 0-360° relative to the display 104.

Figure 1E:
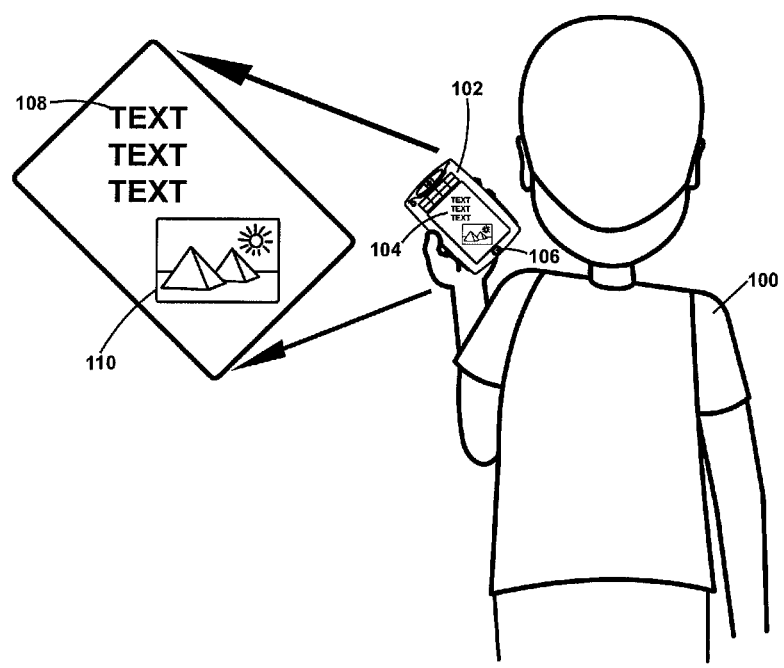

For example, as illustrated in FIG. 1E, the user 100 has rotated the portable electronic device 102 approximately negative 45° relative to the user 100 from the orientation of the portable electronic device 102 relative to the user 100 in FIG. 1D such that the vertical axis (not shown) of the portable electronic device 102 (or display 104) is 225° out of phase with the vertical axis (not shown) of the user's face. By capturing one or more images of the user 100 with the camera 106 and processing the image(s) captured by the camera 106, the portable electronic device 102 can determine that the vertical axis of the portable electronic device 102 (or display 104) is 225° out of phase with the vertical axis of the user's face. Therefore, the portable electronic device 102 has rotated both the first display element 108 and the second display element 110 approximately positive 45° relative to the display 104 from the orientations of the first display element 108 and the second display element 110 relative to the display 104 in FIG. 1D. As a result, the portable electronic device 102 has preserved the orientations of the first display element 108 and the second display element 110 relative to the user 100, despite the fact that the portable electronic device 102 has been rotated approximately positive 45° from the orientation of the portable electronic device 102 relative to the user 100 in FIG. 1D.

In some implementations, the portable electronic device 102 may be configured to adjust the orientations of display elements only in 90° increments relative to the display 104. For example, the portable electronic device 102 may be configured only to display display elements in one of a landscape or a portrait orientation relative to the display 104. In such implementations, the portable electronic device 102 abruptly may adjust the orientation of display elements from a landscape orientation relative to the display 104 to a portrait orientation relative to the display 104 (or vice versa) in response to changes of less than 90° in the orientation of the portable electronic device 102 relative to the user 100. That is to say, the portable electronic device 102 may be configured to adjust the orientation of display elements relative to the display 104 in response to determining that the orientation of the portable electronic device 102 relative to the user 100 has changed by some threshold that is less than 90°. For example, if the user 100 initially is holding the portable electronic device 102 such that display elements are displayed in a portrait orientation, the portable electronic device 102 may be configured to adjust the orientation of the display elements in response to determining that the orientation of the portable electronic device 102 relative to the user 100 has changed by 60° degrees (or some other threshold that is less than 90°).

Although FIGS. 1A-1E illustrate the user 100 rotating the portable electronic device 102 relative to the user, in some implementations, the portable electronic device 102 may be configured to enable the user to rotate the display 104 relative to the user 100 without also rotating the remainder of the body of the portable electronic device itself relative to the user. In such implementations, the portable electronic device may be configured to detect phase differences between the vertical axis of the display 104 and the vertical axis of the user's face and to adjust the orientations of elements displayed on the display 104 in accordance with the detected phase differences between the vertical axis of the display 104 and the vertical axis of the user's face.

FIGS. 2A-2D are illustrations of a first user 200 and a second user 202 interacting with an example of a portable electronic device 204 that is configured to orient displayed elements in accordance with the portable electronic device's orientation (or the orientation of the display 206) relative to a user. As with the portable electronic device 102 of FIGS. 1A-1E, the portable electronic device 204 of FIGS. 2A-2D includes a display 206 and a camera 208 and is configured to determine the orientation of the portable electronic device 204 (or the display 206) relative to either the first user 200 and/or the second user 202 by using the camera 208 to take one or more still or video images of the first user 200 and/or the second user 202 and processing the image(s) of the first user 200 and/or the second user 202 taken using the camera 208.

Figure 2A:
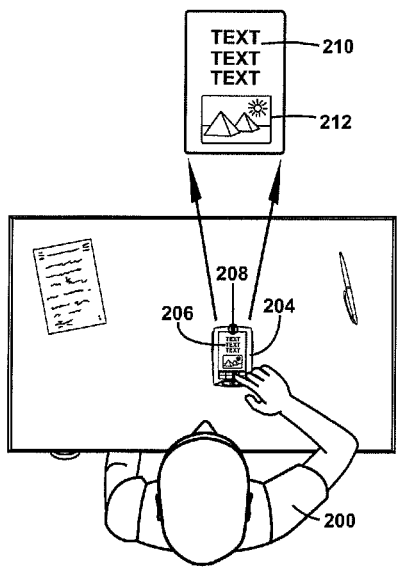
FIGS. 2A-2D are illustrations of two users interacting with an example of a portable electronic device that is configured to orient displayed elements in accordance with the portable electronic device's orientation relative to a user.
Figure 2B:
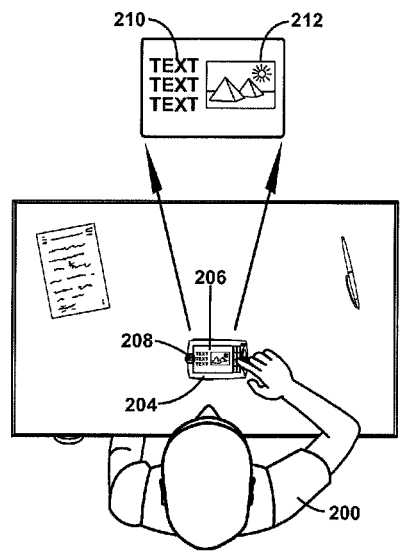

As illustrated in FIGS. 2A and 2B, only the first user 200 is interacting with the portable electronic device 204 and the display 206 is displaying a first display element 210 that displays text and a second display element 212 that displays an image. By capturing one or more images of the first user 200 with the camera 208 and processing the image(s) of the first user 200 captured by the camera 208, the portable electronic device 204 can determine the orientation of the portable electronic device 204 (or display 206) relative to the first user 200 and appropriately orient the first display element 210 and the second display element 212 given the orientation of the portable electronic device 204 (or display 206) relative to the first user 200.

Referring to FIG. 2A, the portable electronic device 204 is positioned with a first orientation relative to the first user 200, and the first display element 210 and the second display element 212 are appropriately oriented on the portable electronic device's display 206 given the orientation of the portable electronic device 204 relative to the first user 200. Referring to FIG. 2B, the orientation of the portable electronic device 204 has been rotated approximately positive 90° relative to the first user 200 from the orientation of portable electronic device 204 relative to the first user 200 in FIG. 2B. Consequently, the portable electronic device 204 has rotated the orientations of the first display element 210 and the second display element 212 approximately negative 90° relative to the display 206 so as to preserve the orientations of the first display element 210 and the second display element 212 relative to the first user 200 despite the fact that the orientation of the portable electronic device 204 has been rotated approximately positive 90° from the orientation of the portable electronic device 204 relative to the first user in FIG. 2A.

Figure 2C:
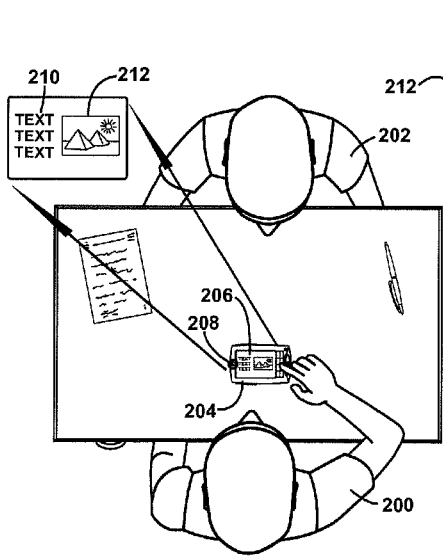
Figure 2D:
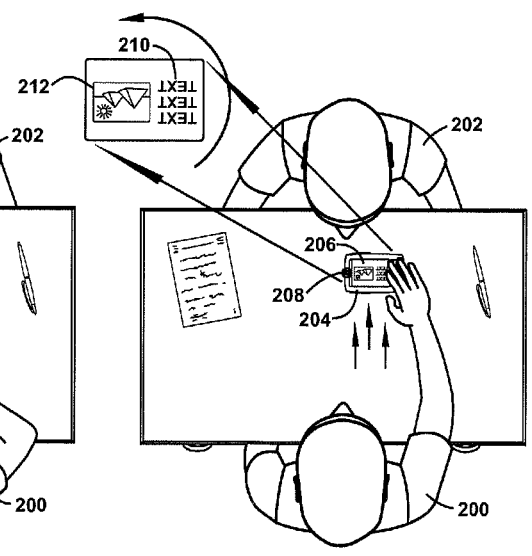

As illustrated in FIGS. 2C and 2D, a second user 202 is sitting across from the first user 200 such that the second user's orientation relative to the portable electronic device 204 is 180° different from the first user's orientation relative to the portable electronic device 204, and both the first user 200 and the second user 202 are interacting with the portable electronic device 204.

Referring to FIG. 2C, the first user 200 is the primary user of the portable electronic device 204, and, therefore, the portable electronic device 204 has oriented the first display element 210 and the second display element 212 appropriately for the first user 200.

In contrast, in FIG. 2D, the first user 200 has passed the portable electronic device 204 to the second user 202 such that the second user 202 has become the primary user of the portable electronic device 204. By capturing one or more images of the second user 202 with the camera 208 and processing the image(s) of the second user 202 captured by the camera 208, the portable electronic device 204 can determine that the second user 202 has become the primary user of the portable electronic device 204 and the portable electronic device 204 can determine the orientation of the portable electronic device 204 (or the display 206) relative to the second user 202 so that the first display element 210 and the second display element 212 can be oriented on the display 206 in a manner that is appropriate for the second user 202. Therefore, because the second user 202 has become the primary user of the portable electronic device 204 in FIG. 2D and because the second user's orientation relative to the portable electronic device 204 (or the display 206) is approximately 180° different from the first user's orientation relative to the portable electronic device 204, the portable electronic device 204 has rotated the orientations of the first display element 210 and the second display element 212 approximately 180° such that the first display element 210 and the second display element 212 are oriented appropriately for the second user 202.

When two or more users are interacting with the portable electronic device 204 and/or when two or more users appear in images captured by the camera 208 for the purpose of determining how to orient elements on the display 206, several different techniques may be employed (either independently or in combination) to identify one user as the primary user of the portable electronic device 204 for whom displayed elements should be oriented. For example, the user who appears most near the center of a captured image 208 may be determined to be the primary user of the portable electronic device 204. Additionally or alternatively, the largest, most significant, or otherwise most prominently visible user in the image may be identified as the primary user of the portable electronic device 204.

In some implementations, the portable electronic device 204 may be configured to recognize users who appear in images captured by the camera 208 based on, for example, the users' facial features. In such implementations, a set of rules may be established to define which user should be identified as the primary user of the portable electronic device 204 when the portable electronic device 204 recognizes one or more users in an image captured by the camera 208. For example, if two users appear in an image captured by the camera 208 and the portable electronic device 204 recognizes one of the users but not the other, the recognized user may be determined to be the primary user of the portable electronic device 204. Additionally or alternatively, a hierarchical ranking of some or all of the users that the portable electronic device 204 is capable of recognizing may be established, and, when multiple users that the portable electronic device 204 is capable of recognizing appear in an image captured by the camera 208, the user that occupies the highest rung in the hierarchy may be determined to be the primary user of the portable electronic device 204.

Figure 3A:
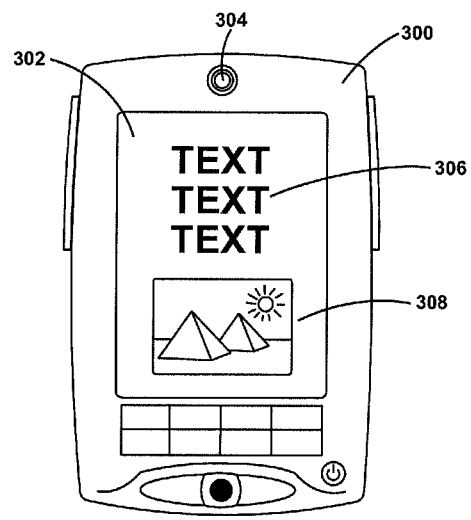
FIG. 3A is a frontal view of an example of a portable electronic device that is configured to orient displayed elements in accordance with the portable electronic device's orientation relative to a user.

FIG. 3A is a frontal view of an example of a portable electronic device 300 that is configured to orient displayed elements in accordance with the portable electronic device's orientation (or the orientation of the display 302) relative to a user. Among other features, the portable electronic device 300 includes a display 302 and a camera 304. As illustrated in FIG. 3A, the portable electronic device's display 302 is displaying a first display element 306 that displays text 306 and a second display element 308 that displays an image.

The portable electronic device 300 is configured to use the camera 304 to capture one or more still or video images of a user of the portable electronic device 300 and to process the image(s) of the user captured by the camera 304 to determine the orientation of the portable electronic device 300 (or the display 302) relative to the user. The portable electronic device 300 then may control the orientation of the first display element 306 and/or the second display element 308 based on the determined orientation of the portable electronic device 300 (or the display 302) relative to the user. As an example, the portable electronic device 300 may rotate (or otherwise adjust the orientation of) the first display element 306 and/or the second display element 308 relative to the display 306 so that the first display element 306 and/or the second display element 308 are oriented conveniently for the user given the orientation of the portable electronic device 300 (or the display 302) relative to the user. For instance, if the user is holding the portable electronic device 300 such that the display 306 is upside down relative to the user, the portable electronic device 300 may rotate the first display element 306 and/or the second display element 308 such that the first display element 306 and/or the second display element 308 are oriented right side up relative to the user notwithstanding that the display 302 is upside down relative to the user.

In some implementations, before the portable electronic device 300 displays an element on the display 302, the portable electronic device 300 first may determine the orientation of electronic device 300 (or the display 302) relative to the user. Then, the portable electronic device 300 may use the orientation of the portable electronic device 300 (or the orientation of the display 302) relative to the user to determine how to initially orient the element on the display 302. In additional or alternative implementations, the portable electronic device 300 may monitor the orientation of the portable electronic device 300 (or the orientation of the display 302) relative to the user over time and appropriately adjust the orientation of elements displayed on the display 302 as the orientation of the portable electronic device 300 (or the orientation of the display 302) relative to the user changes.

In some implementations, the portable electronic device 300 may rely on ambient light and/or a combination of ambient light and illumination provided by the display 302 to illuminate a user's face for the purpose of capturing an image of the user's face. Additionally or alternatively, the portable electronic device 300 may include one or more emitters 305 that are configured to illuminate a user's face, allowing the camera 304 to capture images of the user in low ambient light conditions. In such implementations, the portable electronic device 300 may be configured to cause the emitters 305 to emit light in response to the portable electronic device detecting a low light condition. For example, the portable electronic device 300 may cause the emitters 305 to emit light in response to determining that the brightness of an image captured by the camera 304 is below a brightness threshold. The emitters 305 may produce infra-red illumination, and the camera 304 may be sensitive to infra-red illumination. Additionally or alternatively, the camera may be sensitive to both infra-red and visible light frequencies, and the emitters may augment ambient light with one or both of infra-red and visible light frequencies.

Figure 3B:
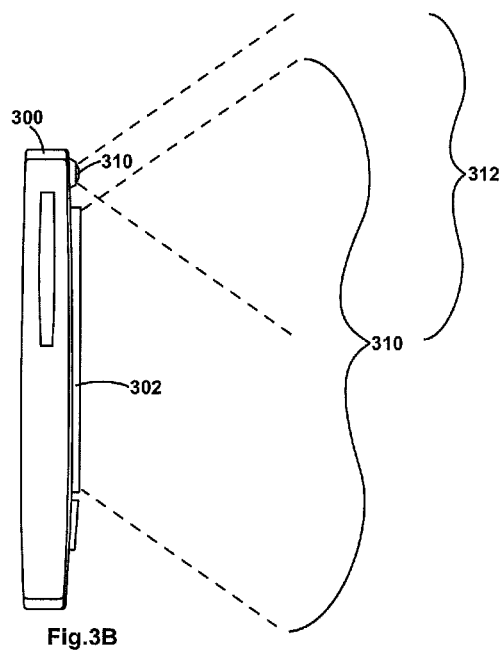
FIG. 3B is a side view of an example of a portable electronic device that is configured to orient displayed elements in accordance with the portable electronic device's orientation relative to a user.

FIG. 3B is a side view of the example of the portable electronic device 300 of FIG. 3A. As illustrated in FIG. 3B, the field of display 310 of the display 302 (which defines the region from within which elements displayed on the display 302 are visible or otherwise satisfy some predefined quality level) overlaps the field of view 312 of the camera 304 (which defines the region that is captured in images taken by the camera 304). Due to the overlap between the field of display 310 of the display 302 and the field of view 312 of the camera 304, it is likely that, when a user is interacting with the display 302, images captured by the camera 304 will include the user.

The physical configuration of the portable electronic device 300 illustrated in FIGS. 3A-3B is merely one example of a physical configuration of a portable electronic device 300. For example, it will be appreciated that the display 302 may be configured in various different sizes and/or aspect ratios and that the display 302 may be positioned in various different locations relative to other features of the portable electronic device 300. Additionally or alternatively, the camera 304 may be positioned in various different locations relative to other features of the portable electronic device 300, including, in some implementations, positions in which the field of display 310 of the display 302 and the field of view 312 of the camera 304 do not overlap (e.g., the camera 304 may be positioned on the back of the portable electronic device 300 instead of the front of the portable electronic device), positions in which the field of view 312 of the camera 304 is entirely within the field of display 310 of the display 302 (e.g., the camera 304 may be positioned behind the display 302), and positions in which the field of view 312 of the camera 304 is perfectly (or substantially perfectly) aligned with the field of display 310 of the display 302.

Figure 4:
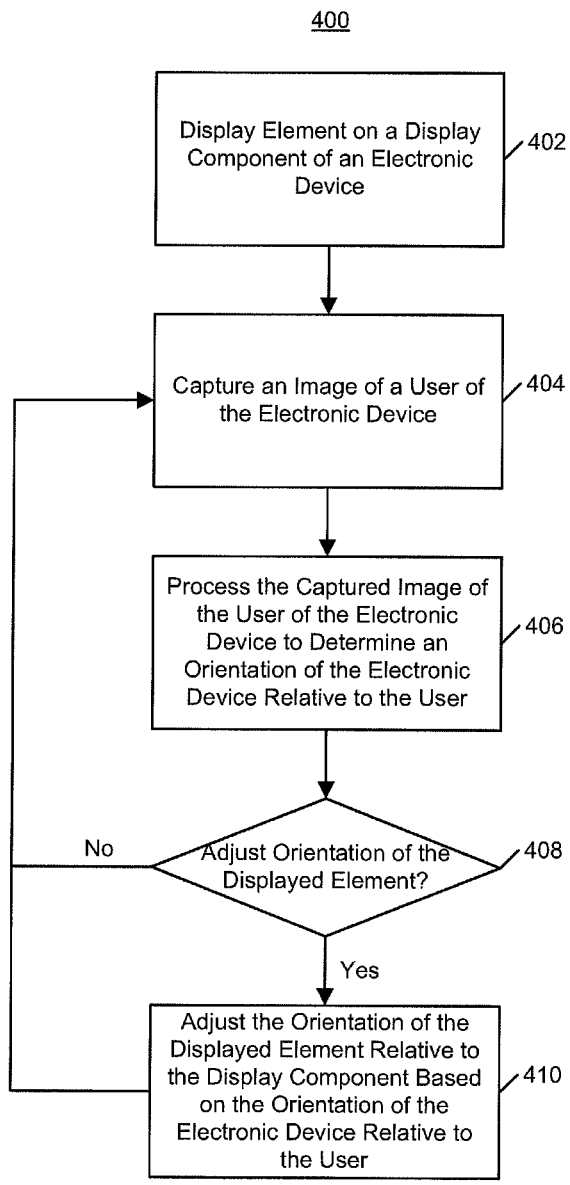
FIG. 4 is a flowchart of an example of a process for controlling the orientation of an element on a display of an electronic device based on the orientation of the electronic device relative to a user of the electronic device.

FIG. 4 is a flowchart 400 of an example of a process for controlling the orientation of an element on a display of an electronic device based on the orientation of the electronic device (or the display) relative to a user of the electronic device. The process 400 may be performed by a portable electronic device such as portable electronic device 102 of FIGS. 1A-1E, portable electronic device 204 of FIGS. 2A-2D, and portable electronic device 300 of FIGS. 3A-3B.

The process begins by displaying an element on a display component of an electronic device (402). In some implementations, before the element is displayed on the display component, the orientation of the electronic device (or the orientation of the display of the electronic device) relative to a user may be determined (using, for example, techniques disclosed herein), and the determined orientation of the electronic device (or the determined orientation of the display of the electronic device) relative to the user may influence the initial orientation of the element when displayed. For example, if the electronic device is a handheld portable digital assistant that is positioned such that the display component is upside down relative to the user, the portable digital assistant initially may display an element with an orientation that is upside down relative to the display component such that the displayed element appears right side up to the user. In other implementations, the orientation of the electronic device (or the orientation of the display of the electronic device) relative to a user may not influence the initial orientation of a displayed element. In such implementations, after the element initially is displayed, the orientation of the element may be adjusted depending on the orientation of the electronic device (or the orientation of the display) relative to the user.

In order to determine an orientation of the electronic device (or the orientation of the display of the electronic device) relative to a user of the electronic device, one or more still or video images of the user of the electronic device are captured by a camera (404). The image(s) of the user captured by the camera then are processed to determine the orientation of the electronic device (or the orientation of the display of the electronic device) relative to the user (406). Various different processing techniques may be applied to an image of the user to determine the orientation of the electronic device (or the orientation of the display of the electronic device) relative to the user.

In some implementations, after capturing an image of a user of the electronic device, a processing routine that is capable of detecting the presence of an upright face (e.g., a face that is within +/−15° of vertical) in an image may be performed on several different orientations of the same captured image of the user, and the orientation of the electronic device (or the orientation of the display of the electronic device) relative to the user may be determined by identifying the orientation of the image of the user that yields the most significant face when the processing routine is performed. For example, if the most significant face is detected when the image is rotated positive 30° from its initial orientation, it may be inferred that the orientation of the electronic device (or the orientation of the display of the electronic device) and the orientation of the user are negative 30° out of phase. In such implementations in which a face detection algorithm is performed on several different orientations of the same image of a user to determine the orientation of the electronic device (or the orientation of the display of the electronic device) relative to the user, the number of different orientations of the image of the user that are subjected to the face detection algorithm may be determined based on the range of the face detection algorithm's tolerance for rotation. For example, if the face detection algorithm is tolerant of rotations of +/−15°, twelve different orientations of the image, wherein each successive orientation of the image is shifted by approximately 30° from the previous image, may be subjected to the face detection algorithm.

In other implementations, processing routines that are capable of determining an orientation of a user in a single image may be employed to determine the orientation of the electronic device (or the orientation of the display of the electronic device) relative to a user of the electronic device. For example, an image of a user's face may be captured, and a processing routine that is capable of determining the orientation of the user's face relative to the captured image may be applied to the captured image in order to determine the orientation of the electronic device (or the orientation of the display of the electronic device) relative to a user of the electronic device.

In addition to determining the orientation of the electronic device relative to the user based on captured image(s) of the user's face, the orientation of the electronic device relative to the user also may be determined by capturing and processing images that include other features of the user of the electronic device. For example, the orientation of the electronic device relative to the user may be determined by capturing one or more images that include one or more of the user's facial features (e.g., the user's eyes) and determining the orientation of the user's facial features captured in the image(s) relative to the electronic device (or the display of the electronic device). Similarly, the orientation of the electronic device relative to the user may be determined by capturing one or more images that include the user's head and determining the orientation of the user's head captured in the image(s) relative to the electronic device (or the display of the electronic device). Additionally or alternatively, the orientation of the electronic device relative to the user may be determined by capturing one or more images that include one or more other body parts of the user (e.g., the user's arm, hand, torso, etc.) and determining the orientation of the user's body part(s) in the image(s) relative to the electronic device (or the display of the electronic device).

After the orientation of the electronic device (or the orientation of the display of the electronic device) relative to the user has been determined, an automatic determination is made as to whether or not to adjust the orientation of the displayed element relative to the display component (408). In some implementations, the electronic device may be configured to adjust the orientation of a displayed element every time the orientation of the electronic device (or the orientation of the display of the electronic device) changes relative to the user. Therefore, in such implementations, if the displayed element is not aligned with the user, a decision to adjust the orientation of the displayed element may be made. In other implementations, the electronic device may be configured to adjust the orientation of a displayed element only after the orientation of the electronic device (or the orientation of the display of the electronic device) relative to the user changes by more than a threshold amount. For example, the electronic device may be configured to dynamically adjust the orientation of a displayed element only after the orientation of the electronic device (or the orientation of the display of the electronic device) relative to the user changes by at least 30°, 45°, 60°, or 90°. Requiring that the orientation of the electronic device (or the orientation of the display of the electronic device) change more than a threshold amount before adjusting the orientation of a displayed element may serve to mitigate or eliminate jitter in the displayed elements that otherwise may result due to the natural shaking of the user's hand and/or other small hand movements.

If a decision is made to adjust the orientation of the displayed element, the orientation of the displayed element is adjusted relative to the display component based on the determined orientation of the electronic device (or the determined orientation of the display of the electronic device) relative to the user (410). For example, if the processing of the image of the user of the electronic device reveals that the orientation of the electronic device (or the orientation of the display of the electronic device) is negative 30° out of phase with the orientation of the user, the orientation of the displayed element may be rotated positive 30° relative to the display component in order to roughly align the displayed element with the user of the electronic device.

In some implementations, the electronic device may be configured to rotate the orientation of a displayed element by any number of degrees. For example, if a user of the electronic device rotates the electronic device approximately 37° in one direction relative to the user, the electronic device may rotate one or more elements displayed on the electronic device's display component approximately 37° in the other direction relative to the display so as to maintain the one or more displayed elements in approximately the same orientation relative to the user. In other implementations, the electronic device may be configured to rotate the orientation of a displayed element only in certain predetermined increments. For example, the electronic device may be configured to rotate displayed elements only in 45° or 90° increments. In such implementations, the electronic device may not rotate the orientation of a displayed element until after the orientation of the electronic device (or the orientation of the display of the electronic device) relative to the user has changed by more than a threshold amount.

In order to appropriately control the orientation of the displayed element over time, the orientation of the electronic device (or the orientation of the display of the electronic device) relative to the user may be monitored over time. Therefore, at some point after determining that it is unnecessary to adjust the orientation of the displayed element or at some point after adjusting the orientation of the displayed element relative to the display component, the process of capturing another image of the user of the electronic device (404), processing the captured image of the user to determine the orientation of the electronic device (or the orientation of the display of the electronic device) relative to the user (406), determining whether to adjust the orientation of the displayed element (408), and adjusting the displayed element relative to the display component based on the determined orientation of the electronic device (or the determined orientation of the display of the electronic device) relative to the user (410) is repeated.

In some implementations, images may be captured by the camera and processed to determine the orientation of the electronic device (or the orientation of the display of the electronic device) relative to the user periodically at a set time interval (e.g., once every second). Additionally or alternatively, images may be captured and processed to determine the orientation of the electronic device (or the orientation of the display of the electronic device) relative to the user in response to a triggering event. For example, the camera may be used to record video, and the recorded video may be processed to detect movement in the video. Among other techniques, optical flow algorithms may be used to detect movement in the video. The appearance of movement in the video may suggest that the electronic device is being moved and/or reoriented relative to a user. Therefore, a still image may be captured and processed to determine the orientation of the electronic device (or the orientation of the display of the electronic device) relative to the user in response to detecting motion in the recorded video. In some implementations, still images may be captured and processed to determine the orientation of the electronic device (or the orientation of the display of the electronic device) relative to the user on a periodic basis while motion continues to be detected in the recorded video. Additionally or alternatively, a still image may be captured and processed to determine the orientation of the electronic device (or the orientation of the display of the electronic device) relative to the user after motion no longer is detected in the recorded video. In other implementations, a still image may be captured and processed to determine the orientation of the electronic device (or the orientation of the display of the electronic device) relative to the user after detecting a peak in the motion in the recorded video.

Processing recorded video to detect the presence of motion in the recorded video may consume less resources (e.g., battery power and/or processor time) than processing an image to determine an orientation of a user within the image. Therefore, recording video and waiting to process an image to determine an orientation of a user within the image until after motion is detected in the recorded video instead of periodically capturing and processing images to determine an orientation of a user within the images may serve to conserve the electronic device's resources.

Figure 5A:
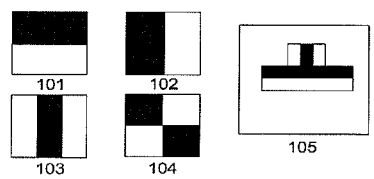
FIG. 5A is an illustration of examples of four types of Haar-like scalar features and their combination.

In some implementations, face detection may include aspects of the AdaBoost algorithm and Haar-like features. Four types of rectangular features (101, 102, 103 and 104) may be used as the basic feature, as shown in FIG. 5A. A feature may be a scalar calculated by summing up the pixels in the white region and subtracting those in the dark region. The calculation of the scalars of different features may be reduced in complexity by employing the integral image [1], and face/non-face classifiers may be constructed by the combination of these features. The integral image II(x, y) at location x, y may be defined as the sum of the pixels above and to the left of x,y [1]:

$$II(x, y) = \sum_{x' \leq x, y' \leq y} I(x', y'), \qquad (1)$$

where I(x', y') is the light intensity at location x', y'. The summation of one rectangular region spanning from $(x_1, y_1)$ and $(x_2, y_2)$ may be derived by $$II(x_2,y_2)-II(x_1,y_1). \qquad (2)$$

Figure 5B:
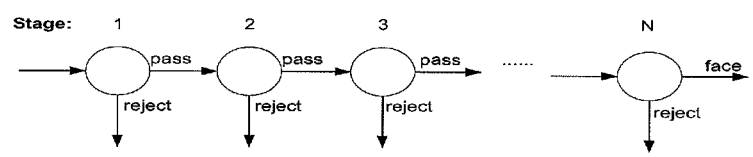
FIG. 5B is an example of a detection cascade structure obtained from the Adaboost algorithm.

In the training phase, the AdaBoost learning procedure may first obtain the best combination of weights and features to form weak classifiers, and then boost them into a strong classifier by minimizing the upper bound on classification error [2]. Eventually the face detector, i.e., a cascade of strong classifiers, may be formed with the structure shown in FIG. 5B, in which each stage (a strong classifier) comprises a set of weak classifiers and the combination/weighting of these weak classifiers is trained using the Adaboost algorithm based on the training samples.

In the detection phase, the candidate region may go through the trained cascade (i.e., a sequence of stages). Every stage may be composed of several features of various aspect ratios arranged in a fixed-sized region of size (m, n) (e.g, =20×20), which is the same for all stages. To better describe the architecture of one stage, an example of a combination is shown as 105 in FIG. 5B. Generally, for a region, there may be tens of thousands of features of varying shapes, sizes and locations. If the region being detected generates a larger response than the threshold (obtained by Adaboost in the training phase) at the current stage, it may be sent to the next level of stage for classification; otherwise, it may be classified as a non-face region. If the candidate region goes to the end of the cascade, it may be classified as a face.

To detect all the faces in an image of size (w, h), all the candidate regions in this image may be tested in this cascade, which means for any possible region ($\alpha$m, $\alpha$n) (aspect ratio $\alpha \geq 1$) at any location (x, y), 0<x≤w, 0<y≤h, it may be downsized to size (m, n) (by a rate$1/\alpha$), and tested through the cascade to decide whether it is a face. In some implementations, the locations being tested may be a couple pixels from each other to save computation time, and only regions of some aspect ratios ($\alpha$) are tested.

After all the possible regions are classified, several neighbor regions around a ground truth face may all show positive results. These positive regions may be merged into a single face by, for example, heuristic methods.

Multiple cascades may be used for the detection of faces of different poses and rotations.

When displaying elements on a display of a portable electronic device, factors other than or in addition to the orientation of the portable electronic device (or the orientation of the display of the portable electronic device) relative to a user of the portable electronic device may influence the orientations of displayed elements. In some implementations, certain types of elements displayed on the portable electronic device may be oriented such that they are aligned with the user of the portable electronic device whereas other types of display elements may have fixed orientations and/or may be oriented to align with other features (e.g., gravity, the earth's ground plate, and/or the horizon). For example, a display element that displays text (or a substantial amount of text) may be oriented to substantially align with a user of the portable electronic device while a display element that displays an image or a video may be oriented to substantially align with the horizon. In such implementations, a gyroscope, accelerometer, or other tilt sensor and/or a camera that is capable of detecting the horizon may be used in order to determine the portable electronic device's orientation relative to the horizon.

Figure 6A:
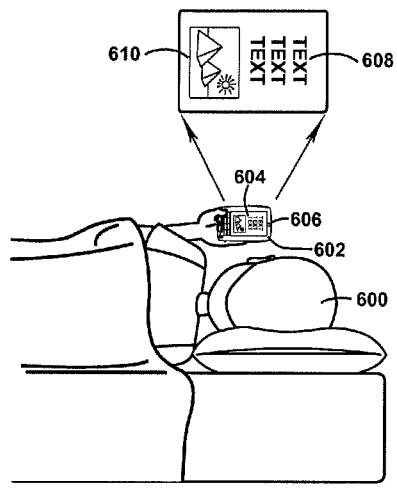
FIGS. 6A-6C are illustrations of a user interacting with an example of a portable electronic device that is configured to orient some displayed elements in accordance with the portable electronic device's orientation relative to a user.
Figure 6C:
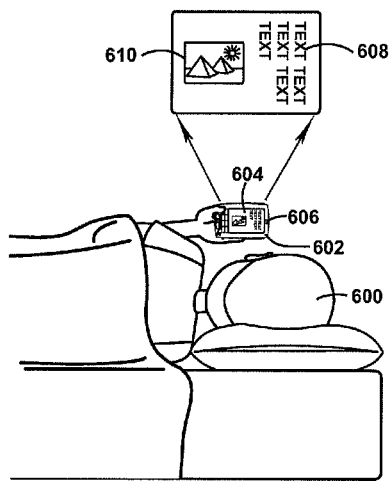
Figure 6B:
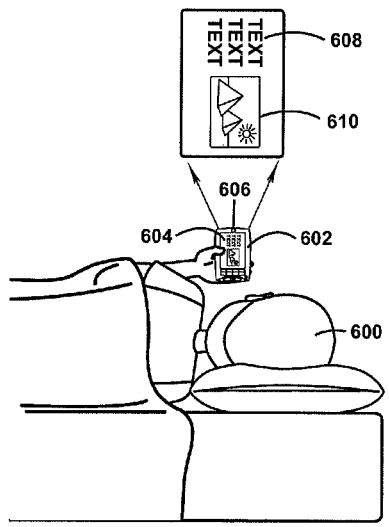

FIGS. 6A-6C are illustrations of a user 600 interacting with an example of a portable electronic device 602 that is configured to orient some displayed elements in accordance with portable electronic device's orientation (or the orientation of the display 604) relative to the user 600. Among other features, the portable electronic device 602 includes a display 604 and a camera 606. The portable electronic device is configured to use the camera 606 to take one or more still or video images of the user 600 and to determine the orientation of the portable electronic device 602 (or the display 604) relative to the user 600 by processing the image(s) of the user 600 taken using the camera 606. The portable electronic device 600 also includes a tilt sensor (not shown) or similar device that is capable of determining the orientation of the portable electronic device 602 relative to gravity, the earth's ground plate, and/or the horizon.

Referring to FIG. 6A, a first display element 608 that displays text and a second display element 610 that displays an image or a video are displayed on the display 604 of the portable electronic device 602. Even though the user 600 is lying down, the portable electronic device 602 can determine the orientation of the portable electronic device 602 (or the display 604) relative to the user 600 by capturing one or more images of the user 600 with the camera 606 and processing the image(s) captured by the camera 606. The portable electronic device 602 then can orient the first display element 608 and/or the second display element 610 such that the first display element 608 and/or the second display element 610 are aligned with the user 600 if it is so desired. As illustrated in FIG. 6A, the portable electronic device 602 has oriented the first display element 608 and the second display element 610 such that the first display element 608 and the second display element 610 are aligned with the user 600.

Referring to FIG. 6B, the user 600 has rotated the portable electronic device 602 approximately positive 90° relative to the user 600 from the orientation of the portable electronic device 602 relative to the user 600 in FIG. 6A. By capturing one or more images of the user 600 with the camera 606 and processing the image(s) captured by the camera 606, the portable electronic device 602 can determine the new orientation of the portable electronic device 602 (or the display 604) relative to the user 600 and the portable electronic device 602 can adjust the orientations of the first display element 608 and/or the second display element 610 such that the first display element 608 and/or the second display element 610 are aligned with the user 600. As illustrated in FIG. 6B, the portable electronic device 602 has rotated both the first display element 608 and the second display element 610 approximately negative 90° relative to the display 604 from the orientations of the first display element 608 and the second display element 610 relative to the display 604 in FIG. 6A. As a result, the portable electronic device 602 has preserved the orientations of the first display element 608 and the second display element 610 relative to the user 600, despite the fact that the portable electronic device 602 has been rotated approximately positive 90° from the orientation of the portable electronic device 602 relative to the user 600 in FIG. 6A.

In some implementations, it may be desired to determine the portable electronic device's orientation relative to gravity, the earth's ground plate, and/or the horizon and to adjust the orientation of one or more displayed elements based on the determined orientation of the portable electronic device 602 relative to gravity, the earth's ground plate, and/or the horizon. For example, irrespective of the portable electronic device's orientation (or the orientation of the display 604) relative to a user, the user may find it easier to view images and/or video on the display 604 when the images and/or video are aligned with the horizon than when the images and/or video are aligned with some other feature (e.g., the user).

Therefore, in some implementations, the orientation of the portable electronic device 602 (or the display 604) relative to the user 600, determined by capturing and processing one or more images of the user 600, may influence the orientations of certain displayed elements while the orientation of the portable electronic device 602 (or the display 604) relative to gravity, the earth's ground plate, and/or the horizon, determined by a tilt sensor (not shown) or similar device, may influence the orientations of certain other displayed elements.

Referring to FIG. 6C, the orientation of the portable electronic device 602 (or the display 604) relative to the user 600 has been determined by the portable electronic device by capturing and processing one or more images of the user 606 and the portable electronic device has oriented the first display element 608, which displays text, so as to be aligned with the user 600. In addition, the orientation of the portable electronic device 602 (or the display 604) relative to gravity, the earth's ground plate, and/or the horizon has been determined by the portable electronic device 602 using a tilt sensor (not shown) or similar device and the portable electronic device has oriented the second display element 610, which displays an image or a video, so as to be aligned with gravity, the earth's ground plate, and/or the horizon.

In some implementations, the arrangement of items displayed on the display of a portable electronic device may be controlled and may differ based on the orientation of the portable electronic device (or the orientation of the display of the portable electronic device) relative to a user of the portable electronic device. For example, different features and/or controls may be made available to a user on the display of the portable electronic device depending upon the orientation of the portable electronic device (or the orientation of the display of the portable electronic device) relative to the user and/or the features and/or controls made available to a user on the display of the portable electronic device may be located in different positions on the display of the portable electronic device depending on the orientation of the portable electronic device (or the orientation of the display of the portable electronic device) relative to the user. Additionally or alternatively, elements displayed on the display of the portable electronic device may be formatted differently depending on the orientation of the portable electronic device (or the orientation of the display of the portable electronic device) relative to the user.

In the particular examples that follow, items displayed on the display of a portable electronic device are arranged depending on whether the display of the portable electronic device is in a landscape orientation relative to the user (i.e., the horizontal dimension of the display relative to the user is longer than the vertical dimension of the display relative to the user) or a portrait orientation relative to the user (i.e., the vertical dimension of the display relative to the user is longer than the horizontal dimension of the display relative to the user). When a displayed element is oriented such that the top and bottom of the displayed element are substantially aligned with the longer edges of the display, the displayed element may be said to be displayed in a landscape orientation. Similarly, when a displayed element is oriented such that the top and bottom of the displayed element are substantially aligned with the shorter edges of the display, the displayed element may be said to be displayed in a portrait orientation.

FIGS. 7A-7B, 8A-8B, 9A-9B, 10A-10B, 11A-11B, 12A-12B, and 13A-13B are illustrations of an example of a portable electronic device 700 that is configured to control the arrangement of displayed items depending on whether the display 702 (or the portable electronic device 700) is in a landscape or a portrait orientation relative to a user (not shown) of the portable electronic device 700. For ease of illustration and to prevent features of the figures from being obscured, no user of the portable electronic device 700 is shown in FIGS. 7A-7B, 8A-8B, 9A-9B, 10A-10B, 11A-11B, 12A-12B, and 13A-13B. Nevertheless, it will be understood that the user's orientation relative to the portable electronic device 700 may be assumed to be the same as if the user is viewing the pages on which FIGS. 7A-7B, 8A-8B, 9A-9B, 10A-10B, 11A-11B, 12A-12B, and 13A-13B are printed in a portrait orientation.

Figure 7A:
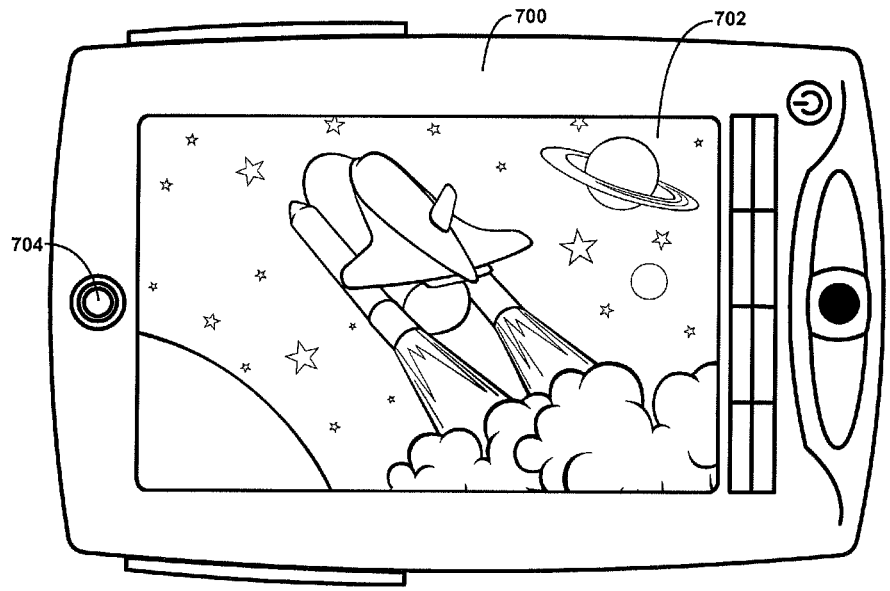

Furthermore, the entire portable electronic device 700 only is illustrated in FIG. 7A, while only the display 702 of the portable electronic device 700 is illustrated in FIGS. 7B, 8A-8B, 9A-9B, 10A-10B, 11A-11B, 12A-12B, and 13A-13B. It will be understood that the display 702 illustrated in FIGS. 7B, 8A-8B, 9A-9B, 10A-10B, 11A-11B, 12A-12B, and 13A-13B is intended to be incorporated into a portable electronic device such as the portable electronic device 700 illustrated in FIG. 7A. As illustrated in FIG. 7A, the portable electronic device 700 includes, among other features, a display 702 and a camera 704. The camera 704 may be used to capture one or more still or video images of the user of the portable electronic device 700 which then may be processed to determine an orientation of the display 702 of the portable electronic device 700 (or an orientation of the portable electronic device 700) relative to the user, and the arrangement of items displayed on the display 702 of the portable electronic device 700 may be altered depending on whether the display 702 (or the portable electronic device 700) is determined to be in a landscape or portrait orientation relative to the user.

Different conditions may be established for determining whether the display 702 (or the portable electronic device 700) is in a landscape or a portrait orientation relative to the user. For example, in some implementations, the display 702 (or the portable electronic device 700) may be considered to be in a portrait orientation relative to the user when the vertical axis of the display 702 (or the portable electronic device 700) is within +/−45° of the vertical axis of the user's face and when the vertical axis of the display 702 (or the portable electronic device 700) is within the range of positive 135-225° of the vertical axis of the user's face. Similarly, in such implementations, the display 702 (or the portable electronic device 700) may be considered to be in a landscape orientation relative to the user of the portable electronic device 700 when the vertical axis of the display 702 (or the portable electronic device 700) is within the range of positive 45-135° of the vertical axis of the user's face and when the vertical axis of the display 702 (or the portable electronic device 700) is within the range of positive 225-315° of the vertical axis of the user's face. Of course, any ranges—and not just those enumerated above—could be defined as corresponding to the portrait and landscape orientations.

In other implementations, the orientation of the display 702 (or the orientation of the portable electronic device 700) may not be determined to have changed from one orientation to another (e.g., from portrait to landscape or from landscape to portrait) until the orientation of the display 702 (or the orientation of the portable electronic device 700) relative to the user has changed substantially +/−90° degrees relative to the user of the portable electronic device 700. For example, if the user of the portable electronic device 700 initially is holding the portable electronic device 700 such that the display 702 (or the portable electronic device 700) is in a portrait orientation relative to the user and then the user begins to rotate the portable electronic device 700 in a counterclockwise direction relative to the user such that the display 702 also rotates in a counterclockwise direction relative to the user, the portable electronic device 702 may not determine that the orientation of the display 702 has changed from the portrait orientation to the landscape orientation relative to the user until the display 702 (or the portable electronic device 700) has been determined to have been rotated substantially 90° in the counterclockwise direction relative to the user.

Figure 7B:
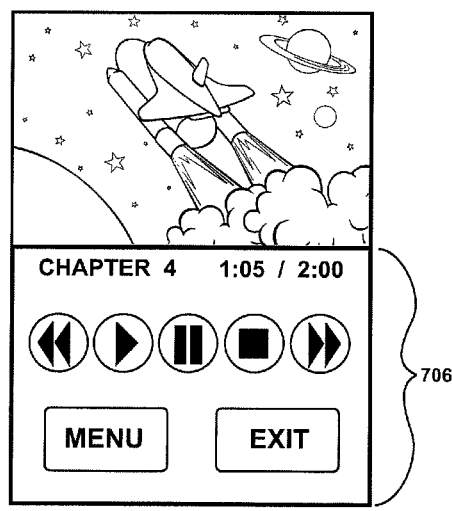

Referring to FIGS. 7A-7B, when a media player or other video application is being used to display a video on the display 702, the portable electronic device 700 may be configured to arrange items on the display 702 differently depending on whether the display 702 (or the portable electronic device 700) is determined to be in a landscape or a portrait orientation relative to a user of the portable electronic device 700. For example, as illustrated in FIG. 7A, when one or more captured images of the user of the portable electronic device 700 reveal that the display 702 (or the portable electronic device 700) is in a landscape orientation relative to the user, the display 702 may be arranged such that the video occupies all of (or substantially all of) the display 702. In contrast, as illustrated in FIG. 7B, when one or more captured images of the user of the portable electronic device 700 reveal that the display 702 (or the portable electronic device 700) is in a portrait orientation relative to the user, the display 702 may be arranged such that the video occupies a smaller portion of the display 702 and controls 706 provided by the media player (e.g., playback controls, a menu control, and an exit control) are made available to the user in the area of the display 702 relinquished by the video. When the portable electronic device 700 is configured in this manner, the user intentionally may rotate the portable electronic device 700 into a landscape orientation relative to the user to maximize the area of the display 702 that is available for displaying a video and the user intentionally may rotate the portable electronic device 700 into a portrait orientation relative to the user in order to gain access to the various different controls 706 provided by the media player.

The portable electronic device 700 also may be configured to arrange items on the display 702 differently depending on whether the display 702 (or the portable electronic device 700) is determined to be in a landscape or a portrait orientation relative to a user of the portable electronic device 700 when a still image viewer is being used to display photographs and/or still images on the display 702.

Figure 8A:
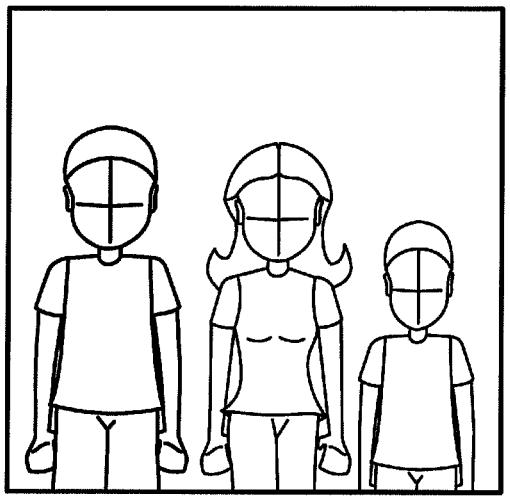
Figure 8B:
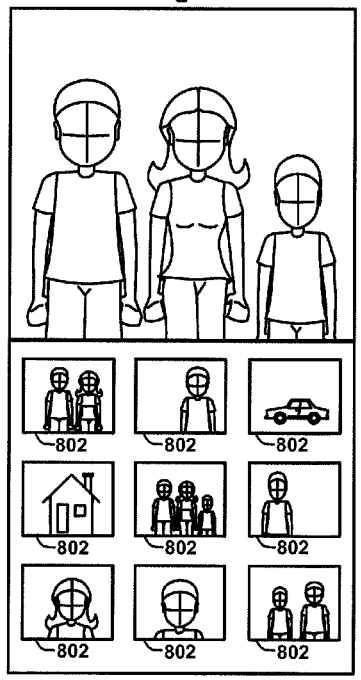

For example, in one implementation, as illustrated in FIG. 8A, when one or more captured images of the user of the portable electronic device 700 reveal that display 702 (or the portable electronic device 700) is in a landscape orientation relative to the user, the display 702 may be arranged such that a selected photograph or still image occupies all of (or substantially all of) the display 702. In contrast, as illustrated in FIG. 8B, when one or more captured images of the user of the portable electronic device 700 reveal that the portable electronic device 700 is in a portrait orientation relative to the user, the display 702 may be arranged such that the selected photograph or still image occupies a smaller portion of the display 702 and selectable thumbnails 802 (or other representations (e.g., links)) of other available photographs or still images and/or controls provided by the still image viewer are made available to the user in the area of the display 702 relinquished by the selected still image. When the portable electronic device 700 is configured in this manner, the user intentionally may rotate the portable electronic device 700 into a landscape orientation relative to the user to maximize the area of the display 702 that is available for displaying a selected photograph or still image and the user intentionally may rotate the portable electronic device 700 into a portrait orientation relative to the user in order to gain access to other photographs and still images and/or various different controls provided by the still image viewer.

Figure 9A:
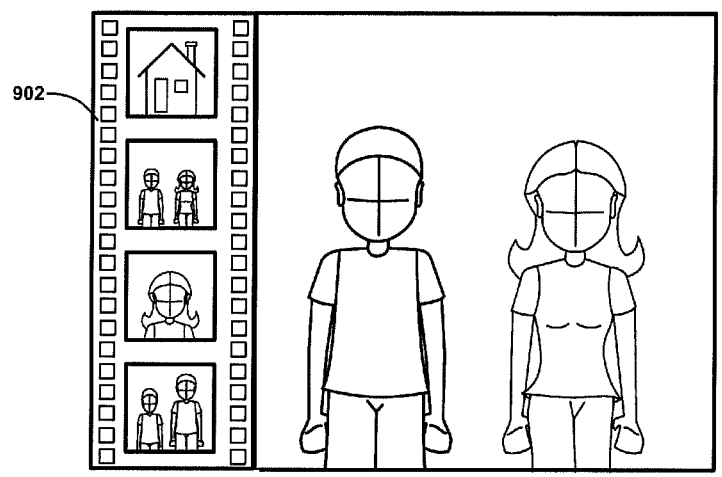
Figure 9B:
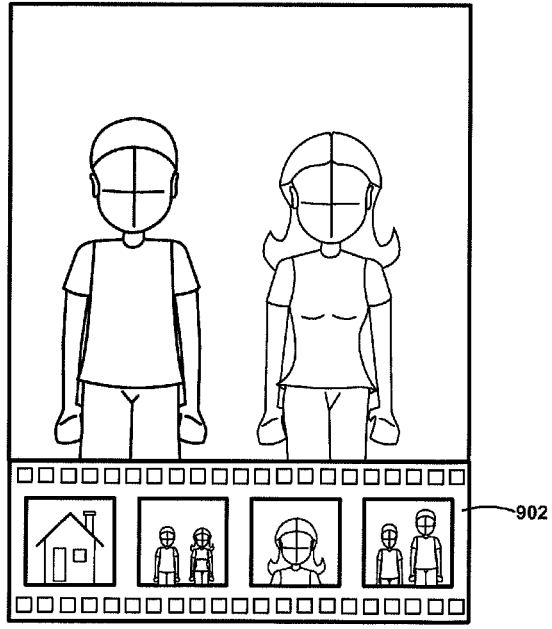

Referring to FIGS. 9A-9B, in alternative implementations, when a still image viewer is being used to display photographs and/or still images on the display 702, a selected photograph or still image and selectable thumbnails (or other representations (e.g., links)) of other available photographs or still images and/or controls provided by the still image viewer may be displayed irrespective of whether the display 702 (or the portable electronic device 700) is in a landscape or a portrait orientation relative to the user. However, the positioning of the selected photograph or still image and the selectable thumbnails (or other representations (e.g., links)) of other available photographs or still images and/or controls provided by the still image viewer may depend on whether the display 702 of the portable electronic device is in a landscape or a portrait orientation relative to the user.

For example, as illustrated in FIG. 9A, when one or more captured images of the user of the portable electronic device 700 reveal that the portable electronic device 700 is in a landscape orientation relative to the user, the display 702 may be arranged such that the selectable thumbnails (or other representations (e.g., links)) of available photographs or still images and/or controls provided by the still image viewer are displayed in a vertical strip 902 (e.g., a filmstrip) along one edge (e.g., the left or right edge) of the display 702 and the selected photograph or still image occupies the remainder of (or at least some portion of the remainder) of the display 702. In such an arrangement, the location of the vertical strip may be determined based upon whether the user of the portable electronic device is right-handed or left-handed such that user interaction with the vertical strip 902 does not result in occlusion of a large portion of the display 702. For example, if the user of the portable electronic device 700 is left-handed, the vertical strip 902 may be positioned along the left edge of the display 702 and if the user of the portable electronic device 700 is right-handed, the vertical strip 902 may be positioned along the right edge of the display 702. Referring now to FIG. 9B, when one or more captured images of the user of the portable electronic device 700 reveal that the display 702 (or the portable electronic device 700) is in a portrait orientation relative to the user, the display 702 may be arranged such that the selectable thumbnails (or other representations (e.g., links)) of available photographs or still images and/or controls provided by the still image viewer are displayed in a horizontal strip 902 (e.g., a filmstrip) along one edge (e.g., the top or bottom edge) of the display 702 and the selected photograph or still image occupies the remainder of (or at least some portion of the remainder of) the display 702. When the portable electronic device 702 is configured in this manner, the aspect ratio of selected photograph or other still image may be preserved irrespective of whether the display 702 (or the portable electronic device 700) is in a landscape or a portrait orientation relative to the user.

In some implementations, the portable electronic device 700 may be configured to format text that is displayed on the display 702 (e.g., text that is included in a web page or a page of an eBook that is displayed on the display 702) differently depending on whether the display 702 (or the portable electronic device 700) is in a landscape or a portrait orientation relative to the user.

For example, referring to FIGS. 10A-10B, in some implementations, text that is displayed on the display 702 may be displayed in a fixed font size irrespective of whether the display 702 (or the portable electronic device 700) is in a landscape or a portrait orientation relative to the user, but the line wrapping of the displayed text may be altered depending on whether the display 702 (or the portable electronic device 700) is in a landscape or a portrait orientation relative to the user.

Alternatively, in other implementations, as illustrated in FIGS. 11A-11B, the portable electronic device 700 may display text with a fixed line width irrespective of whether the display 702 (or the portable electronic device 700) is in a landscape or a portrait orientation relative to the user, but the font size of the displayed text may be adjusted depending on whether the display 702 (or the portable electronic device 700) is in a landscape or a portrait orientation relative to the user. Referring to FIG. 11A, when the portable electronic device 702 is configured in this manner, text is displayed with a relatively large font size when one or more captured images of the user of the portable electronic device 700 reveal that the display 702 (or the portable electronic device 700) is in a landscape orientation relative to the user. In contrast, referring to FIG. 11B, text is displayed with a relatively small font size when one or more captured images of the user of the portable electronic device 700 reveal that the display 702 (or the portable electronic device 700) is in a portrait orientation relative to the user. Therefore, the user of the portable electronic device 700 intentionally may rotate the portable electronic device 700 such that the display 702 (or the portable electronic device 700) is in a landscape orientation relative to the user in order to effectively zoom in on a portion of the displayed text and the user intentionally may rotate the portable electronic device 700 such that the display 702 (or the portable electronic device 700) is in a portrait orientation relative to the user in order to view all of (or at least a larger portion of) the displayed text.

In some implementations, the portable electronic device 700 may display a page of a preformatted document where the layout of a page (e.g., the text line width or position of graphical elements) is predefined. A preformatted document may be a PDF document, HTML page, or other document including layout and formatting information, for example. In such cases, the portable electronic device may not dynamically re-format the page in response to detecting a change in orientation of the display 702 (or the portable electronic device 700) relative to the user. Rather, the portable electronic device 702 may be configured to display an entire page of (or a large portion of) the document when one or more captured images of the user of the portable electronic device 700 reveal that the display 702 (or the portable electronic device 700) is in a portrait orientation relative to the user and to display a smaller portion of the page when one or more captured images of the user of the portable electronic device 700 reveal that the display 702 (or the portable electronic device 700) is in a landscape orientation relative to the user. Therefore, the user of the portable electronic device 700 intentionally may rotate the portable electronic device 700 such that the display 702 (or the portable electronic device 700) is in a landscape orientation relative to the user in order to effectively zoom in on a portion of the displayed page and the user intentionally may rotate the portable electronic device 700 such that the display 702 (or the portable electronic device 700) is in a portrait orientation relative to the user in order to view all of (or at least a larger portion of) the displayed page.

The portable electronic device 700 also may be configured to arrange items on the display 702 differently depending on whether the display 702 (or the portable electronic device 700) is determined to be in a landscape or a portrait orientation relative to a user of the portable electronic device 700 when components of a messaging application (e.g., an e-mail application, an instant messaging application, a web log ("blog") application, and/or a photo sharing application) displayed on the display 702.

Figure 12A:
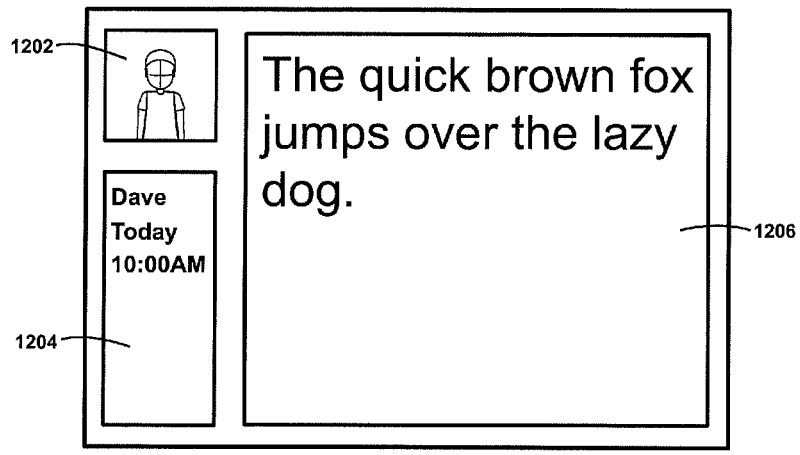
Figure 12B:
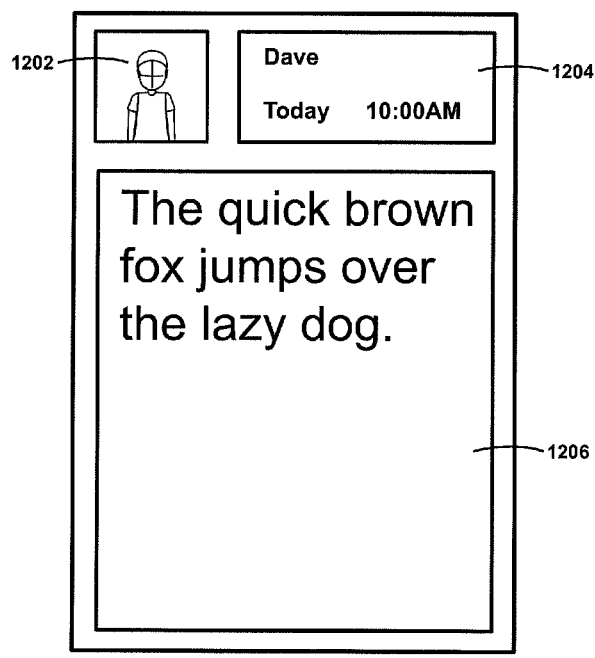

For example, referring to FIGS. 12A-12B, the messaging application may include a user-avatar block 1202 having, for example, a thumbnail-sized photograph, still image, or animation that represents a user of the messaging application, an information block 1204 that provides background information about a user of the messaging application and/or a message generated using the messaging application, and a content block 1206 that includes a message that may include, for example, text, one or more photographs or still images, and/or one or more videos.

As illustrated in FIG. 12A, when one or more captured images of the user of the portable electronic device 700 reveal that the display 702 (or the portable electronic device 700) is in a landscape orientation relative to the user, the display 702 may be arranged such that the user-avatar block 1202 and the information block 1204 are displayed along a vertical edge (e.g., the left or right edge) of the display 702 and the content block 1206 occupies the remainder (or at least some portion of the remainder) of the display 702. In contrast, as illustrated in FIG. 12B, when one or more captured images of the user of the portable electronic device 700 reveal that the display 702 (or the portable electronic device 700) is in a portrait orientation relative to the user, the display 702 may be arranged such that the user-avatar block 1202 and the information block 1204 are displayed along a horizontal edge (e.g., the top or bottom edge) of the display 702 and the content block 1206 occupies the remainder of (or at least some portion of the remainder of) the display 702. When the portable electronic device 702 is configured in this manner, the aspect ratio of the content block 1206 may be preserved irrespective of whether the display 702 (or the portable electronic device 700) is in a landscape or a portrait orientation relative to the user.

Figure 13A:
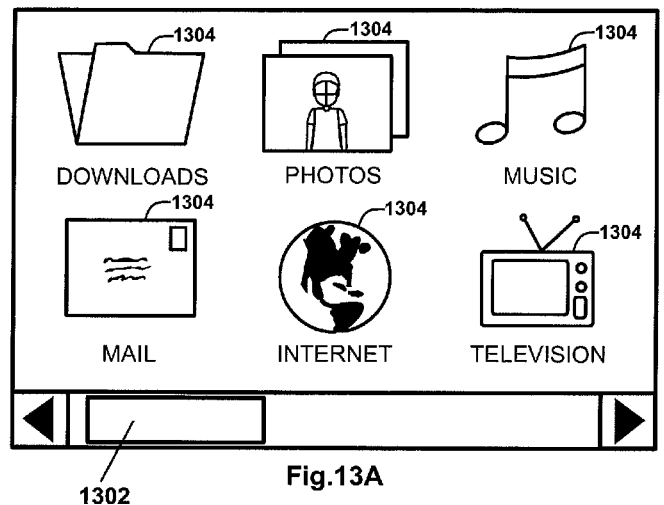
Figure 13B:
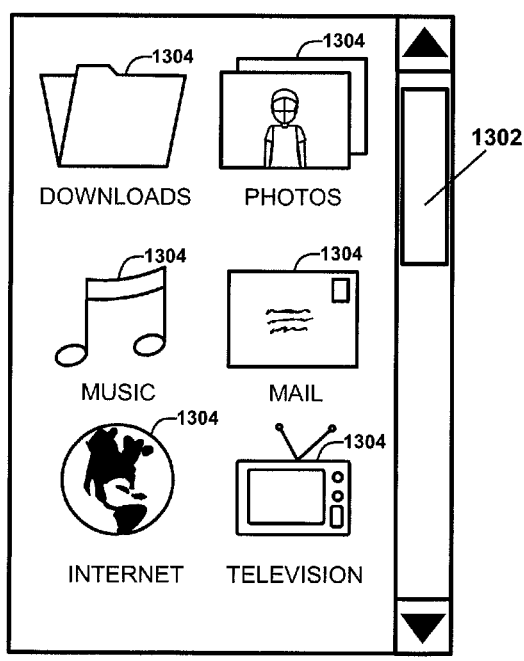

In some implementations, the portable electronic device may be configured to arrange a scrollable list (or menu) differently depending on whether the display 702 (or the portable electronic device 700) is in a landscape or a portrait orientation relative to the user. As illustrated in FIGS. 13A-13B, a scrollable list (or menu) may include a scroll bar 1302 for scrolling through the list (or menu) and one or more selectable (and/or non-selectable) items (e.g., folders/directories, files, songs, videos, photographs, still images, contacts, applications, etc.) which may be represented by, for example, text, images, icons, animations, or some combination of text, images, icons, and/or animations. When such a scrollable list (or menu) is displayed on the display 702 of the portable electronic device 700, the scroll bar 1302 may be fixed along a long edge of the display 702 of the portable electronic device irrespective of whether the display 702 (or the portable electronic device 700) is in a landscape or a portrait orientation relative to the user, while the orientations of the representations 1304 of the items that comprise the list (or menu) may be rotated relative to the display 702 depending on whether the display 702 (or the portable electronic device 700) is in a landscape or a portrait orientation relative to the user.

For example, referring to FIG. 13A, when one or more captured images of the user of the portable electronic device 700 reveal that the portable electronic device 700 is in a landscape orientation relative to the user, the display 702 may be arranged such that the scroll bar 1302 is displayed along either the top or bottom edge of the display 1702 while representations 1304 of items that comprise the list (or menu) may occupy the remainder of (or at least some portion of the remainder of) the display 1304. As illustrated in FIG. 13B, when one or more captured images of the user of the portable electronic device 700 reveal that the display 702 (or the portable electronic device 700) has been rotated relative to the user from the orientation of the display 702 (or the portable electronic device 700) of FIG. 13A such that the display 702 (or the portable electronic device 700) is in a portrait orientation relative to the user, the scroll bar 1302 may remain fixed along a long edge (e.g., either the left or right edge) of the display 702 while the orientations of representations 1304 of items that comprise the list (or menu) may be rotated appropriately given the new orientation of the display 702 of the portable electronic device 700 relative to the user.

In some implementations, the display 702 may be a touch screen display that enables a user to interact with the portable electronic device by touching or gesturing in the vicinity of items displayed on the display. In such implementations, the portable electronic device 700 may arrange the display of touchable controls and items on the display 702 dependent on the orientation of the display 702 of the portable electronic device 700 (or an orientation of the portable electronic device 700) relative to the user so as to reduce the portion of the screen that is occluded from a user's view by the user's own hand(s) while the user is touching or otherwise interacting with the touchable controls and items.

The camera 704 may be used to capture one or more still or video images of the user of the portable electronic device 700. The portable electronic device 700 then may process the captured image(s) to determine or predict an area of the display 702 that is likely to be occluded by the path of a user's finger when the user is touching controls and other touchable items on the display 702. For example, the portable electronic device 700 may know that a user is right-handed. Consequently, the portable electronic device 700 may predict that the path of the user's finger is most likely to occlude the right and/or bottom portion of the display 702 relative to the user when the user is touching controls or other items on the display 702. (In contrast, if the portable electronic device 700 knows that a user is left-handed, the portable electronic device 700 may predict that the path of the user's finger is most likely to occlude the left and/or bottom portion of the display 702 relative to the orientation of the user when the user is touching controls or other items on the display 702.) Therefore, in the case of a user whom the portable electronic device 700 knows to be right-handed, after the portable electronic device 700 determines the orientation of the display 702 of the portable electronic device 700 (or an orientation of the portable electronic device 700) relative to the user, the portable electronic device may position controls and other touchable items on the display toward the right and/or bottom of the display 702 relative to the user so as to minimize the portion of the screen that is occluded from the user's view while the user is touching a control or other touchable item.

For example, referring again to FIG. 13B, the portable electronic device 700 may know or determine that the user is right-handed. As a result, the portable electronic device 700 may determine that the path of the user's finger is most likely to cross the edge of the display 702 that is toward the right and/or bottom of the display 702 relative to the user when the user touches the scroll bar 1302. Therefore, after determining the orientation of the display 702 (or the portable electronic device 700) relative to the user, the portable electronic device may display the scroll bar 1302 along the long edge of the display 702 that is on the right side of the display 702 relative to the user. As such, the location of the scroll bar 1302 may not be fixed along a particular one of the long edges of the display 702. Rather, when the long edges of the display 702 are substantially in phase with the vertical axis of a user, the portable electronic device 700 may choose to display the scroll bar 1302 along the long edge of the display 702 that minimizes the portion of the screen that is occluded by the user's fingers as the user touches the scroll bar 1302. For example, in the case of a user whom the portable electronic device 702 knows to be right-handed, when the long edges of the display 702 are substantially in phase with the vertical axis of the user, the portable electronic device 700 may choose to display the scroll bar 1302 along the long edge of the display that is on the right side of the display 702 relative to the user.

The systems and techniques described above are not limited to any particular hardware or software configuration. Rather, they may be implemented using hardware, software, or a combination of both. In addition, the methods and processes described may be implemented as computer programs that are executed on programmable computers comprising at least one processor and at least one data storage system. The computer programs may be implemented in a high-level compiled or interpreted programming language, or, additionally or alternatively, the computer programs may be implemented in assembly or other lower level languages, if desired. Such computer programs typically will be stored on computer-readable storage media or devices (e.g., CD-ROM, RAM, or magnetic disk). When read into a processor of a computer and executed, the instructions of the programs may cause a programmable computer to carry out the various operations described above.

A number of implementations have been described. Nevertheless, it will be understood that various modifications and implementations may be made. For example, while the disclosed systems and techniques for orienting displayed elements relative to a user generally may have been described in the context of portable electronic devices, the systems and techniques for orienting displayed elements relative to a user may be equally applicable to any display device whether that display device is associated with a portable electronic device or a stationary electronic device (e.g., a display for a desktop computer, a television, a digital picture frame, etc.). Furthermore, it will be appreciated that the disclosed systems and techniques for orienting elements displayed on an electronic device relative to a user may involve determining the orientation of the electronic device relative to the user and/or determining the orientation of the display of the electronic device relative to the user. Determining the orientation of the display of the electronic device relative to the user may have particular applicability when orienting elements displayed on an electronic device that includes a display that itself can be rotated (or otherwise manipulated) relative to the body of the electronic device because the orientation of the display of the electronic device relative to the user may be important in determining the appropriate orientation for the displayed elements relative to the user.

In addition to facilitating the determination of the orientation of the display of a portable electronic device (or the orientation of the portable electronic device) relative to a user, captured images of a user of a portable electronic device may have further utility. For example, a portable electronic device having a camera may capture images with the camera on a periodic, random, or event-triggered basis and the portable electronic device may turn off (or otherwise dim) the display of the portable electronic device when the presence of a face is not detected in the images captured by the camera. Likewise, the portable electronic device may turn on (or otherwise increase the illumination of) the display of the portable electronic device when the presence of a face is detected in the images captured by the camera.

Furthermore, as discussed above, in some implementations, the portable electronic device may be configured not just to detect the presence of a face in an image, but also to recognize the identity of a face in a captured image. In such implementations, access to the portable electronic device may be regulated based on the portable electronic device's ability to recognize a face in a captured image. For example, access to the portable electronic device may be granted only when a recognized face is present in an image captured by the camera.

Additionally or alternatively, the portable electronic device may be associated with two or more different users and the portable electronic device may grant a first set of access privileges to the portable electronic device when a face belonging to a first user of the portable electronic device is recognized in an image captured by the camera and the portable electronic device may grant a second set of access privileges to the portable electronic device when a face belonging to a second user of the portable electronic device is recognized in an image captured by the camera. For example, the portable electronic device may be associated with an adult user and a child user and the access privileges granted by the portable electronic device when the face of the adult user is recognized in an image captured by the camera may be different from the access privileges granted by the portable electronic device when the face of the child user is recognized in an image captured by the camera. When the face of the adult user is recognized in an image captured by the camera, a first set of applications that are registered as being associated with the adult user may be made available by the portable electronic device, a first set of contacts that are registered as being associated with the adult user may be made available by the portable electronic device, and unrestricted Internet browsing may be permitted by the portable electronic device. In contrast, when the face of the child user is recognized in an image captured by the camera, a second set of applications that are registered as being associated with the child user may be made available by the portable electronic device, a second set of contacts that are registered as being associated with the child user may be made available by the portable electronic device, and parental controls may be applied to Internet browsing performed using the portable electronic device.

In some implementations, it may be possible to lock a portable electronic device so that the orientations of elements displayed on the portable electronic device's display are not adjusted when the orientation of the portable electronic device relative to the user changes.

Moreover, in some implementations, the orientation of a portable electronic device relative to a user of the portable electronic device may be determined by capturing and processing images of other features that may or may not include the user of the portable electronic device. For example, a camera on a portable electronic device may capture one or more images that include the horizon, the images may be processed to determine the orientation of the horizon relative to the captured image(s), and the orientation of display elements may be adjusted based on whether the horizon is oriented horizontally or vertically relative to the captured image(s).

In some cases, components and other features disclosed above may be described as being configured in a certain manner. It will be appreciated that such components also may be described as being constructed, adapted, built, arranged, and/or assembled in a certain manner.

Of course, useful results may be achieved if steps of the disclosed techniques are performed in a different order and/or if components in the disclosed systems are combined in a different manner and/or replaced or supplemented by other components.

What is claimed is:

1. A method for orienting elements displayed on a display component of an electronic device, the method comprising:
    initially displaying one or more elements on a display component of an electronic device;
    after initially displaying the one or more elements on the display component of the electronic device, detecting a movement of the electronic device with a set of one or more images, the detecting comprising processing the set of one or more images using a first processing type;
    in response to detecting the movement, determining an orientation of the electronic device relative to a user, the determining comprising processing a captured image using a second processing type; and
    based on the determined orientation of the electronic device relative to the user, adjusting an orientation of at least one of the displayed elements relative to the display component of the electronic device.

2. The method of claim 1 wherein:
    initially displaying one or more elements on a display component of the electronic device includes displaying the at least one displayed element with an initial orientation relative to the user; and
    adjusting the orientation of the at least one displayed element relative to the display component of the electronic device includes adjusting the orientation of the at least one displayed element relative to the display component of the electronic device such that, after adjusting the orientation of the at least one displayed element relative to the display component of the electronic device, the orientation of the at least one displayed element, relative to the user, is substantially the same as the initial orientation of the at least one displayed element relative to the user.

3. The method of claim 1 wherein:
    the display component of the electronic device supports displaying elements according to at least a portrait orientation relative to the display component and a landscape orientation relative to the display component;
    initially displaying the one or more elements on the display component of the electronic device includes initially displaying the at least one element on the display component of the electronic device according to the landscape orientation relative to the display component;
    determining an orientation of the electronic device relative to the user includes determining that the display component of the electronic device is in a portrait orientation relative to the user; and
    adjusting the orientation of the at least one displayed element relative to the display component of the electronic device includes changing the orientation of the at least one displayed element from the landscape orientation relative to the display component to the portrait orientation relative to the display component in response to determining that the display component of the electronic device is in a portrait orientation relative to the user.

4. The method of claim 1 wherein:
    the display component of the electronic device supports displaying elements according to at least a portrait orientation relative to the display component and a landscape orientation relative to the display component;
    initially displaying the one or more elements on the display component of the electronic device includes initially displaying the at least one element on the display component of the electronic device according to the portrait orientation relative to the display component;

determining an orientation of the electronic device relative to the user includes determining that the display component of the electronic device is in a landscape orientation relative to the user; and adjusting the orientation of the at least one displayed element relative to the display component of the electronic device includes changing the orientation of the at least one displayed element from the portrait orientation relative to the display component to the landscape orientation relative to the display component in response to determining that the display component of the electronic device is in a landscape orientation relative to the user.

5. The method of claim 1 wherein:

the captured image of the user of the electronic device includes at least a portion of the user's face; and determining an orientation of the electronic device relative to the user based on the captured image of the user of the electronic device includes:
   determining an orientation of the user's face in the captured image relative to the captured image using an AdaBoost process, and
   determining an orientation of the electronic device relative to the user based on the determined orientation of the user's face in the captured image relative to the captured image.

6. The method of claim 5 wherein:

the captured image of the user of the electronic device includes the user's eyes;

determining an orientation of the user's face in the captured image relative to the captured image includes determining an orientation of the user's eyes in the captured image relative to the captured image; and determining an orientation of the electronic device relative to the user based on the determined orientation of the user's face in the captured image relative to the captured image includes determining an orientation of the electronic device relative to the user based on the determined orientation of the user's eyes in the captured image relative to the captured image.

7. The method of claim 1 wherein:

the captured image of the user of the electronic device includes at least a portion of the user's head; and determining an orientation of the electronic device relative to the user based on the captured image of the user of the electronic device includes:
   determining an orientation of the portion of the user's head in the captured image relative to the captured image, and
   determining an orientation of the electronic device relative to the user based on the determined orientation of the portion of the user's head in the captured image relative to the captured image.

8. The method of claim 1 wherein:

the captured image of the user of the electronic device includes at least a portion of the user's body; and determining an orientation of the electronic device relative to the user based on the captured image of the user of the electronic device includes:
   determining an orientation of the portion of the user's body in the captured image relative to the captured image, and
   determining an orientation of the electronic device relative to the user based on the determined orientation of the portion of the user's body in the captured image relative to the captured image.

9. The method of claim 1 wherein:

the captured image of a user of the electronic device includes at least a portion of the user's face; and determining an orientation of the electronic device relative to the user based on the captured image of the user of the electronic device includes:
   generating at least two different versions of the captured image, each of the different versions of the captured image being oriented differently,
   performing face detection on each of the differently-oriented versions of the captured image,
   based on results of performing face detection on each of the differently-oriented versions of the captured image, selecting a particular version of the captured image as the version of the captured image that represents the orientation of the electronic device relative to the user,
   determining the orientation of the selected version of the captured image relative to the orientation of the originally captured image; and
   determining an orientation of the electronic device relative to the user based on the determined orientation of the selected version of the captured image relative to the orientation of the originally captured image.

10. The method of claim 9 wherein:

performing face detection on each of the differently-oriented versions of the captured image includes assigning a score to each of the differently-oriented versions of the captured image, wherein the score assigned to each of the differently-oriented versions of the captured image reflects a significance of a presence of a face in the version of the captured image; and selecting a particular version of the captured image as the version of the captured image that represents the orientation of the electronic device relative to the user includes identifying a particular version of the captured image that was assigned a score that reflects, among the differently-oriented versions of the captured image, the most significant presence of a face.

11. The method of claim 1 further comprising:

after determining an orientation of the electronic device relative to the user and adjusting the orientation of the at least one displayed element relative to the display component of the electronic device, capturing an image of another user of the electronic device;

based on the captured image of the other user of the electronic device, determining an orientation of the electronic device relative to the other user; and based on the determined orientation of the electronic device relative to the other user, adjusting the orientation of the at least one displayed element relative to the display component of the electronic device.

12. The method of claim 1 wherein:

determining the orientation of the electronic device relative to the user includes determining that the orientation of the electronic device relative to the user has changed from an earlier orientation of the electronic device relative to the user; and adjusting the orientation of the at least one displayed element relative to the display component includes changing the orientation of the at least one displayed element relative to the display component in response to the determination that the orientation of the electronic device relative to the user has changed from the earlier orientation of the electronic device relative to the user.

13. The method of claim 1 wherein:
  determining the orientation of the electronic device relative to the user includes determining that the orientation of the electronic device relative to the user has not changed from an earlier orientation of the electronic device relative to the user; and
  adjusting the orientation of the at least one displayed element includes maintaining the orientation of the at least one displayed element relative to the display component in response to the determination that the orientation of the electronic device relative to the user has not changed from the earlier orientation of the electronic device relative to the user.

14. The method of claim 1 further comprising:
  determining an initial orientation of the electronic device relative to the user before initially displaying the one or more elements on the display component of the electronic device; and
  determining an initial orientation for the at least one element relative to the display component based on the determined initial orientation of the electronic device relative to the user, wherein initially displaying the one or more elements on the display component of the electronic device includes displaying the at least one element on the display component of the electronic device with the initial orientation determined for the at least one element.

15. The method of claim 1 wherein adjusting the orientation of the at least one displayed element relative to the display component of the electronic device includes:
  determining, based on the determined orientation of the electronic device relative to the user, that the at least one displayed element is not appropriately oriented relative to the user; and
  adjusting the orientation of the at least one displayed element relative to the display component of the electronic device in response to determining that the at least one displayed element is not appropriately oriented relative to the user.

16. The method of claim 1 wherein adjusting an orientation of the at least one displayed element relative to the display component of the electronic device includes automatically adjusting the orientation of the at least one displayed element relative to the display component of the electronic device based on the determined orientation of the electronic device relative to the user.

17. The method of claim 1 wherein determining an orientation of the electronic device relative to the user includes determining an orientation of the electronic device relative to the user without relying on gravity to determine the orientation of the electronic device relative to the user.

18. The method of claim 1 wherein:
  initially displaying one or more elements on a display component of an electronic device includes initially displaying a first element that is to be oriented relative to a user and a second element that is to be oriented relative to gravity;
  adjusting an orientation of at least one of the displayed elements relative to the display component of the electronic device includes:
    determining, based on the determined orientation of the electronic device relative to the user, that the first element is not appropriately oriented relative to the user, and
    adjusting the orientation of the first element relative to the display component of the electronic device in response to determining that the at least one displayed element is not appropriately oriented relative to the user; and
  the method further comprises:
    determining an orientation of the electronic device relative to gravity,
    determining, based on the determined orientation of the electronic device relative to gravity, that the second element is not appropriately oriented relative to gravity, and
    adjusting the orientation of the second element relative to the display component of the electronic device in response to determining that the at least one displayed element is not appropriately oriented relative to gravity.

19. The method of claim 18 wherein:
  initially displaying a first element that is to be oriented relative to a user includes initially displaying a first element that displays text; and
  initially displaying a second element that is to be oriented relative to gravity includes initially displaying a second element that displays a video.

20. A method for orienting elements displayed on a display component of an electronic device, the method comprising:
  capturing a first image of a user of an electronic device that has a display component;
  based on the captured first image of the user of the electronic device, determining an initial orientation of the electronic device relative to the user of the electronic device;
  before displaying an element on a display component of the electronic device, determining an initial orientation for displaying the element relative to the display component of the electronic device based on the determined initial orientation of the electronic device relative to the user of the electronic device;
  displaying the element on the display component of the electronic device with the determined initial orientation for displaying the element relative to the display component;
  detecting a movement of the electronic device with a set of one or more images by processing the set of one or more images using a first processing type; and
  based on a captured second image and in response to detecting the movement, determining a subsequent orientation for displaying the element relative to the display component of the electronic device by processing the captured second image using a second processing type.

21. The method of claim 1, wherein the set of one or more images and the captured image are included in a video.

22. The method of claim 1, wherein the first processing type comprises an optical flow algorithm.

23. The method of claim 1, wherein the second processing type comprises an face detection algorithm.

24. A method for orienting elements displayed on a display component of an electronic device, the method comprising:
  displaying one or more elements on a display component of an electronic device;
  detecting a movement of the electronic device with a set of one or more images, the detecting comprising processing the set of one or more images using a first processing type;
  in response to detecting the movement, monitoring orientation of the electronic device relative to a user based on one or more captured images of the user of the electronic device, the monitoring comprising processing the one or more captured images using a second processing type; and controlling display on the display component of at least one of the displayed elements based on results of monitoring the orientation of the electronic device relative to the user.

25. The method of claim 24 wherein:

monitoring the orientation of the electronic device relative to the user includes detecting a change in the orientation of the electronic device relative to the user from an earlier orientation of the electronic device relative to the user; and controlling the display of the at least one displayed element on the display component includes:

in response to detecting the change in orientation of the electronic device relative to the user, determining an appropriate change to an orientation of the at least one displayed element relative to the display component based on the detected change in the orientation of the electronic device relative to the user, and effecting the change to the orientation of the at least one displayed element relative to the display component that was determined to be appropriate based on the detected change in the orientation of the electronic device relative to the user.

26. The method of claim 25 wherein:

detecting a change in the orientation of the electronic device relative to the user from the earlier orientation of the electronic device relative to the user includes determining that the orientation of the electronic device relative to the user rotated substantially positive ninety degrees from the earlier orientation of the electronic device relative to the user;

determining the appropriate change to the orientation of the at least one displayed element relative to the display component includes determining to rotate the orientation of the at least one displayed element substantially negative ninety degrees relative to the display component in response to determining that the orientation of the electronic device relative to the user rotated substantially positive ninety degrees from the earlier orientation of the electronic device relative to the user; and effecting the change to the orientation of the at least one displayed element relative to the display component that was determined to be appropriate includes rotating the orientation of the at least one displayed element substantially negative ninety degrees relative to the display component.

27. The method of claim 26 wherein:

monitoring the orientation of the electronic device relative to the user further includes determining that the orientation of the electronic device relative to the user rotated another substantially positive ninety degrees after determining that the orientation of the electronic device relative to the user rotated substantially positive ninety degrees from the earlier orientation of the electronic device relative to the user; and controlling the display of the at least one displayed element on the display component further includes rotating the orientation of the at least one displayed element another substantially ninety degrees relative to the display component after rotating the orientation of the at least one displayed element substantially negative ninety degrees relative to the display component of the electronic device in response to determining that the orientation of the electronic device relative to the user rotated another substantially positive ninety degrees.

28. The method of claim 25 wherein:

detecting a change in the orientation of the electronic device relative to the user from the earlier orientation of the electronic device relative to the user includes determining that the orientation of the electronic device relative to the user rotated substantially positive one-hundred and eighty degrees from the earlier orientation of the electronic device relative to the user;

determining the appropriate change to the orientation of the at least one displayed element relative to the display component includes determining to rotate the orientation of the at least one displayed element substantially negative one-hundred and eighty degrees relative to the display component in response to determining that the orientation of the electronic device relative to the user rotated substantially positive one-hundred and eighty degrees from the earlier orientation of the electronic device relative to the user; and effecting the change to the orientation of the at least one displayed element relative to the display component that was determined to be appropriate includes rotating the orientation of the at least one displayed element substantially negative one-hundred and eighty degrees relative to the display component.

29. The method of claim 25 wherein:

detecting a change in the orientation of the electronic device relative to the user from the earlier orientation of the electronic device relative to the user includes determining that the orientation of the electronic device relative to the user rotated a number of degrees relative to the user that is in a range between substantially zero degrees and substantially ninety degrees in a positive direction from the earlier orientation of the electronic device relative to the user;

determining the appropriate change to the orientation of the at least one displayed element relative to the display component includes determining to rotate the orientation of the at least one displayed element substantially the number of degrees in the range between substantially zero degrees and substantially ninety degrees in a negative direction relative to the display component in response to determining that the orientation of the electronic device relative to the user rotated the number of degrees relative to the user in the range between substantially zero degrees and substantially ninety degrees; and effecting the change to the orientation of the at least one displayed element relative to the display component includes rotating the orientation of the at least one displayed element substantially the number of degrees in the range between substantially zero degrees and substantially ninety degrees in a negative direction relative to the display component.

30. The method of claim 24 wherein:

monitoring the orientation of the electronic device relative to the user includes determining that the orientation of the electronic device relative to the user has not changed from an earlier orientation of the electronic device relative to the user; and controlling the display of the at least one displayed element relative to the user includes maintaining an orientation of the at least one displayed element relative to the display component based on determining that the orientation of the electronic device relative to the user has not changed from an earlier orientation of the electronic device relative to the user.

31. The method of claim 24 wherein:
monitoring the orientation of the electronic device relative to the user includes detecting a change in the orientation of the electronic device relative to the user from an earlier orientation of the electronic device relative to the user; and
controlling the display of the at least one displayed element on the display component includes, in response to detecting the change in orientation of the electronic device relative to the user, hiding the at least one displayed element by removing the at least one displayed element from the display component.

32. The method of claim 24 wherein:
monitoring the orientation of the electronic device relative to the user includes detecting a change in the orientation of the electronic device relative to the user from an earlier orientation of the electronic device relative to the user; and
controlling the display of the at least one displayed element on the display component includes, in response to detecting the change in orientation of the electronic device relative to the user, maintaining, on the display component, a first displayed element and a second displayed element and changing, on the display component, a position and orientation of the first displayed element relative to the second displayed element.

33. The method of claim 24 wherein:
monitoring the orientation of the electronic device relative to the user includes detecting a change in the orientation of the electronic device relative to the user from an earlier orientation of the electronic device relative to the user; and
controlling the display of the at least one displayed element on the display component includes, in response to detecting the change in orientation of the electronic device relative to the user, reformatting text displayed on the display component, including at least one of changing a font size of the text displayed on the display component and maintaining a subset of the text displayed on the display component while removing a remainder of the text displayed on the display component that is not included in the subset.

34. The method of claim 20, wherein the initial orientation for displaying the element is the same as the subsequent orientation.

35. The method of claim 20, wherein the initial orientation for displaying the element differs from the subsequent orientation.

36. The method of claim 20, wherein the user in the first image is the same as a user in the second image.

37. The method of claim 20, wherein the user in the first image and a user in the second image are different users.

38. The method of claim 1 wherein detecting the movement of the electronic device in relation to the user of the electronic device includes processing video captured by the electronic device.

39. An apparatus comprising:
means for initially displaying one or more elements at an electronic device;
means for detecting a movement of the electronic device with a set of one or more images after initially displaying the one or more elements, the means for detecting comprising means for processing the set of one or more images using a first processing type;
means for determining, in response to detecting movement, an orientation of the electronic device relative to a user of the electronic device, the means for determining comprising means for processing a captured image using a second processing type; and
means for adjusting an orientation of at least one of the displayed elements based on the determined orientation of the electronic device relative to the user.

40. A non-transitory computer-readable storage medium having stored thereon instructions that when executed by a computer cause the computer to:
initially display one or more elements on a display component of an electronic device;
after initially displaying the one or more elements on the display component of the electronic device, detect a movement of the electronic device with a set of one or more images by processing the set of one or more images using a first processing type;
in response to detecting the movement, determine an orientation of the electronic device relative to a user by processing a captured image using a second processing type; and
based on the determined orientation of the electronic device relative to the user, adjust an orientation of at least one of the displayed elements relative to the display component of the electronic device.

41. An electronic device comprising:
a display; and
a processing unit communicatively coupled with the display and configured to:
cause the display to initially display one or more elements;
after initially displaying the one or more elements on the display, use a set of one or more images to determine the electronic device has been moved by processing the set of one or more images using a first processing type;
in response to determining the electronic device has been moved, determine an orientation of the electronic device relative to a user by processing a captured image using a second processing type; and
based on the determined orientation of the electronic device relative to the user, adjust an orientation of at least one of the displayed elements relative to the display.

42. The method of claim 41, further comprising a camera, the camera being configured to capture images of a user of the electronic device.

* * * * *